(12) United States Patent
Lima et al.

(10) Patent No.: US 11,377,537 B2
(45) Date of Patent: Jul. 5, 2022

(54) MULTILAYER COMPOSITES COMPRISING ADHESIVE AND ONE OR MORE NANOFIBER SHEETS

(71) Applicant: Lintec of America, Inc., Richardson, TX (US)

(72) Inventors: Marcio D. Lima, Richardson, TX (US); Julia Bykova, Richardson, TX (US)

(73) Assignee: LINTEC OF AMERICA, INC., Richardson, TX (US)

( * ) Notice: Subject to any disclaimer, the term of this patent is extended or adjusted under 35 U.S.C. 154(b) by 795 days.

(21) Appl. No.: 15/916,354

(22) Filed: Mar. 9, 2018

(65) Prior Publication Data

US 2018/0194101 A1   Jul. 12, 2018

Related U.S. Application Data

(63) Continuation of application No. PCT/US2016/051689, filed on Sep. 14, 2016.

(30) Foreign Application Priority Data

Sep. 14, 2015 (JP) .............................. JP2015-180950

(51) Int. Cl.
*B32B 9/00* (2006.01)
*C08K 3/04* (2006.01)
(Continued)

(52) U.S. Cl.
CPC ................ *C08K 3/041* (2017.05); *B32B 5/02* (2013.01); *B32B 5/12* (2013.01); *B32B 7/06* (2013.01);
(Continued)

(58) Field of Classification Search
CPC ........ Y10T 428/30; B32B 9/007; B82Y 30/00
(Continued)

(56) References Cited

U.S. PATENT DOCUMENTS 4,258,100 A   3/1981 Fujitani et al.
4,301,040 A   11/1981 Berbeco
(Continued)

FOREIGN PATENT DOCUMENTS

CN   102026066   4/2011
CN   104125925   10/2014
(Continued)

OTHER PUBLICATIONS

English Translation of CN Office Action and Search Report received for CN Application No. 201680053360.5. dated Jul. 30, 2019. 10 pages.
(Continued)

*Primary Examiner* — Daniel H Miller
(74) *Attorney, Agent, or Firm* — Greenblum & Bernstein, P.L.C.

(57) ABSTRACT

Techniques are disclosed for producing multilayered composites of adhesive nanofiber composites. Specifically, one or more sheets of highly aligned nanofibers are partially embedded in an adhesive such that at least a portion of the nanofiber sheet is free from adhesive and is available to conduct current with adjacent electrical features. In some example embodiments, the adhesive nanofiber composites are metallized with a conductive metal and in these and other embodiments, the adhesive nanofiber composites may also be stretchable.

20 Claims, 11 Drawing Sheets

(51) Int. Cl.
  B32B 5/02      (2006.01)
  B32B 7/12      (2006.01)
  C09J 9/02      (2006.01)
  C09J 7/38      (2018.01)
  C09J 7/22      (2018.01)
  C08J 5/18      (2006.01)
  C08J 7/04      (2020.01)
  C08J 7/043     (2020.01)
  C08J 7/044     (2020.01)
  B32B 5/12      (2006.01)
  B32B 7/06      (2019.01)
  B32B 15/14     (2006.01)
  C09J 201/02    (2006.01)
  B32B 17/10     (2006.01)
  B32B 27/30     (2006.01)
  C08J 5/04      (2006.01)
  C08L 23/08     (2006.01)
  C08L 29/14     (2006.01)
  C08K 3/08      (2006.01)
  C08K 7/06      (2006.01)
  B82Y 30/00     (2011.01)
  B82Y 40/00     (2011.01)
  B32B 9/04      (2006.01)

(52) U.S. Cl.
  CPC ........... *B32B 7/12* (2013.01); *B32B 9/007* (2013.01); *B32B 15/14* (2013.01); *B32B 17/10889* (2013.01); *B32B 27/30* (2013.01); *C08J 5/042* (2013.01); *C08J 5/18* (2013.01); *C08J 7/043* (2020.01); *C08J 7/044* (2020.01); *C08J 7/0427* (2020.01); *C08K 3/08* (2013.01); *C08L 23/0853* (2013.01); *C08L 29/14* (2013.01); *C09J 7/22* (2018.01); *C09J 7/38* (2018.01); *C09J 9/02* (2013.01); *C09J 201/02* (2013.01); *B32B 9/043* (2013.01); *B32B 17/10788* (2013.01); *B32B 2260/021* (2013.01); *B32B 2260/046* (2013.01); *B32B 2307/202* (2013.01); *B32B 2307/732* (2013.01); *B32B 2307/748* (2013.01); *B32B 2311/18* (2013.01); *B82Y 30/00* (2013.01); *B82Y 40/00* (2013.01); *C08J 2383/04* (2013.01); *C08J 2483/04* (2013.01); *C08K 3/04* (2013.01); *C08K 3/042* (2017.05); *C08K 3/045* (2017.05); *C08K 7/06* (2013.01); *C08K 2003/0831* (2013.01); *C08K 2003/0881* (2013.01); *C08K 2201/011* (2013.01); *C09J 2301/16* (2020.08); *C09J 2301/302* (2020.08); *C09J 2301/314* (2020.08); *C09J 2301/40* (2020.08); *C09J 2301/408* (2020.08); *Y10T 428/30* (2015.01)

(58) Field of Classification Search
  USPC ........................................................ 428/408
  See application file for complete search history.

(56) References Cited

U.S. PATENT DOCUMENTS

| | | | |
|---|---|---|---|
| 4,874,549 | A | 10/1989 | Michalchik |
| 4,943,978 | A | 7/1990 | Rice |
| 5,925,275 | A | 7/1999 | Lawson et al. |
| 7,067,328 | B2 | 6/2006 | Dubrow et al. |
| 7,462,498 | B2 | 12/2008 | Mao et al. |
| 7,622,314 | B2 | 11/2009 | Liang |
| 7,641,885 | B2 | 1/2010 | Liu et al. |
| 7,648,406 | B2 | 1/2010 | Tai et al. |
| 7,662,467 | B2 | 2/2010 | Li et al. |
| 7,811,149 | B2 | 10/2010 | Liu et al. |
| 7,854,992 | B2 | 12/2010 | Fu et al. |
| 7,947,145 | B2 | 5/2011 | Wang et al. |
| 8,007,617 | B2 | 8/2011 | Min et al. |
| 8,076,829 | B2 | 12/2011 | Chen et al. |
| 8,084,097 | B2 | 12/2011 | Fisher et al. |
| 8,318,033 | B2 | 11/2012 | Fu et al. |
| 8,351,220 | B2 | 1/2013 | Liang et al. |
| 8,974,960 | B2 | 3/2015 | Manthiram et al. |
| 9,067,791 | B2 | 6/2015 | Kim et al. |
| 9,095,639 | B2 | 8/2015 | Ajayan et al. |
| 2004/0261987 | A1* | 12/2004 | Zhang .............. F28F 1/14 165/183 |
| 2004/0265489 | A1* | 12/2004 | Dubin ............ H01L 23/433 427/212 |
| 2005/0062024 | A1 | 3/2005 | Bessette et al. |
| 2006/0057388 | A1 | 3/2006 | Jin et al. |
| 2007/0012900 | A1 | 1/2007 | Callen et al. |
| 2007/0024177 | A1* | 2/2007 | Choi .............. B82Y 10/00 313/495 |
| 2007/0103048 | A1* | 5/2007 | Liu ................ H01J 9/025 313/311 |
| 2008/0245548 | A1 | 10/2008 | Fu et al. |
| 2008/0292840 | A1 | 11/2008 | Majumdar et al. |
| 2009/0047513 | A1 | 2/2009 | Lashmore |
| 2009/0068387 | A1 | 3/2009 | Panzer et al. |
| 2009/0159198 | A1 | 6/2009 | Wang et al. |
| 2009/0264036 | A1 | 10/2009 | Yano et al. |
| 2010/0003877 | A1 | 1/2010 | Fan et al. |
| 2010/0009267 | A1 | 1/2010 | Chase et al. |
| 2010/0098931 | A1 | 4/2010 | Daniel et al. |
| 2010/0261058 | A1 | 10/2010 | Lopatin et al. |
| 2010/0296677 | A1 | 11/2010 | Jiang et al. |
| 2010/0311866 | A1 | 12/2010 | Huang et al. |
| 2011/0007477 | A1 | 1/2011 | Xu et al. |
| 2011/0069860 | A1 | 3/2011 | Liu et al. |
| 2011/0159269 | A1 | 6/2011 | Qian et al. |
| 2011/0160372 | A1 | 6/2011 | Youm et al. |
| 2011/0259518 | A1 | 10/2011 | Tojo et al. |
| 2012/0060826 | A1* | 3/2012 | Weisenberger .......... C08J 5/005 126/569 |
| 2013/0104396 | A1* | 5/2013 | Fan ................ A61N 1/056 29/874 |
| 2013/0118682 | A1 | 5/2013 | Zeininger |
| 2013/0171406 | A1 | 7/2013 | Suehiro et al. |
| 2013/0341081 | A1 | 12/2013 | Liang et al. |
| 2014/0035708 | A1 | 2/2014 | Athanasiou et al. |
| 2014/0124495 | A1 | 5/2014 | Feng et al. |
| 2014/0151111 | A1 | 6/2014 | Shah et al. |
| 2014/0287641 | A1 | 9/2014 | Steiner, III |
| 2015/0014047 | A1 | 1/2015 | Hutchison et al. |
| 2015/0034859 | A1 | 2/2015 | Compton et al. |
| 2015/0044656 | A1 | 2/2015 | Eichhorn et al. |
| 2015/0118514 | A1 | 4/2015 | Zhao et al. |
| 2015/0140888 | A1 | 5/2015 | Lee et al. |
| 2015/0147573 | A1 | 5/2015 | Zhang et al. |
| 2015/0019163 | A1 | 7/2015 | Otaka et al. |
| 2018/0043665 | A1 | 2/2018 | Ovalle |
| 2018/0194101 | A1 | 7/2018 | Lima et al. |

FOREIGN PATENT DOCUMENTS

| | | |
|---|---|---|
| DE | 3146235 | 5/1983 |
| EP | 0342258 | 11/1989 |
| JP | 05013983 A | 1/1993 |
| JP | H09190921 A | 7/1997 |
| JP | 2000027072 A | 1/2000 |
| JP | 2003336166 A | 11/2003 |
| JP | 2004269878 A | 9/2004 |
| JP | 2005007861 A | 1/2005 |
| JP | 2005063994 A | 10/2005 |
| JP | 2006-035771 | 2/2006 |
| JP | 2008145208 A | 6/2008 |
| JP | 2008523254 A | 7/2008 |
| JP | 2009-184910 | 8/2009 |
| JP | 2009542860 A | 12/2009 |
| JP | 2010006663 A | 1/2010 |
| JP | 201535333 A | 11/2010 |

(56) References Cited

FOREIGN PATENT DOCUMENTS

| | | |
|---|---|---|
| JP | 2013514210 A | 4/2013 |
| JP | 2014508054 A | 4/2014 |
| JP | 2015528827 A | 10/2015 |
| JP | 2015-211180 A | 11/2015 |
| JP | 2016-020552 | 2/2016 |
| WO | 2005/070656 | 8/2005 |
| WO | 2005070656 A2 | 8/2005 |
| WO | 2007015710 A2 | 2/2007 |
| WO | 2008005782 A2 | 1/2008 |
| WO | 2009106389 A2 | 2/2009 |
| WO | 2011075344 A1 | 6/2011 |
| WO | 2012094398 A1 | 7/2012 |
| WO | 2013/162649 | 10/2013 |
| WO | 2013183882 A1 | 12/2013 |
| WO | 2014-089081 | 6/2014 |
| WO | 2016126827 A1 | 8/2016 |
| WO | 2016/136686 | 9/2016 |
| WO | 2016136686 A1 | 11/2017 |

OTHER PUBLICATIONS

English Translation of CN Office Action and Search Report received for CN Application No. 201680053441.5. dated Jul. 29, 2019. 3 pages.
Extended European Search Report received for EP Application No. 16847213.2, dated Aug. 8, 2018, 4 pages.
Partial Supplementary European Search Report received for EP Application No. 168472704.1, dated Aug. 8, 2018, 12 pages.
Non-Final Rejection, received in U.S. Appl. No. 15/915,608, dated Aug. 30, 2018, 19 pages.
Duncan et al., "Techniques For Characterising the Wetting, Coating and Spreading of Adhesives on Surfaces", National Physical Laboratory, Mar. 2005, NPL Report DEPC-MPR-020, Middlesex, UK, 48 pages.
International Preliminary Report on Patentability received for Patent Application No. PCT/US2016/051672, dated Mar. 29, 2018, 9 pages.
International Preliminary Report on Patentability received for Patent Application No. PCT/US2016/051686, dated Mar. 29, 2018, 7 pages.
International Preliminary Report on Patentability received for Patent Application No. PCT/US2016/051689, dated Mar. 29, 2018, 8 pages.
International Preliminary Report on Patentability received for Patent Application No. PCT/US2016/051742, dated Mar. 29, 2018, 9 pages.
International Search Report and Written Opinion received for Patent Application No. PCT/US2016/051672, dated Dec. 20, 2016, 12 pages.
International Search Report and Written Opinion received for Patent Application No. PCT/US2016/051686, dated Jan. 9, 2017, 14 pages.
International Search Report and Written Opinion received for Patent Application No. PCT/US2016/051689, dated Jan. 30, 2017, 15 pages.
International Search Report and Written Opinion received for Patent Application No. PCT/US2016/051742, dated Dec. 19, 2016, 12 pages.
Munir, et al., "Carbon Nanotube Reinforced Titanium Metal Matrix Composites Prepared by Powder Metallurgy—A Review", Critical Reviews in Solid State and Material Sciences, 0:1-18, Aug. 2014, 19 pages.
Zou, et al, "Carbide-Forming Groups IVB-VIB Metals: A New Territory in the Periodic Table for CVD Growth of Graphene", NANO Letters, American Chemical Society, ACS Publications, May 29, 2014,vol. 14, pp. 3832-3839.
Non-Final Office Action and Search Report for Taiwan Patent Application No. 105130024, dated Aug. 22, 2017, 11 pages.
English Translation of KR Office Action received for KR Application No. 10-2018-7007498, dated Mar. 15, 2019. 2 pages.
European Communication pursuant to Article 94(3) EPC received for EP Application No. 16847204.1, dated Mar. 8, 2019. 9 pages.
English Translation of KR Office Action received for KR Application No. 10-2018-7007603, dated Mar. 18, 2019. 2 pages.
Supplementary European Search Report received for EP Application No. 168472704.1, dated Oct. 29, 2018, 6 pages.
Notice of Allowance received for U.S. Appl. No. 15/915,608, dated Nov. 8, 2018, 26 pages.
Extended European Search Report received for EP Application No. 16847234.8, dated Jun. 4, 2019. 8 pages.
Japanese Office Action received for JP Application No. 2018-532545, dated Mar. 22, 2019. 4 pages.
Japanese Office Action received for JP Application No. 2018-532541, dated Mar. 29, 2019. 4 pages.
Translation of JP Office Action received for JP Application No. 2018-532538, dated May 15, 2020. 6 pages.
Notice of Allowance dated Feb. 9, 2021 issued in Chinese Patent Application No. 201680053360.5 along with English translation.
Japanese Office Action dated Nov. 4, 2021, issued in Japanese patent application No. 2020-180619 along with corresponding English machine translation.

\* cited by examiner

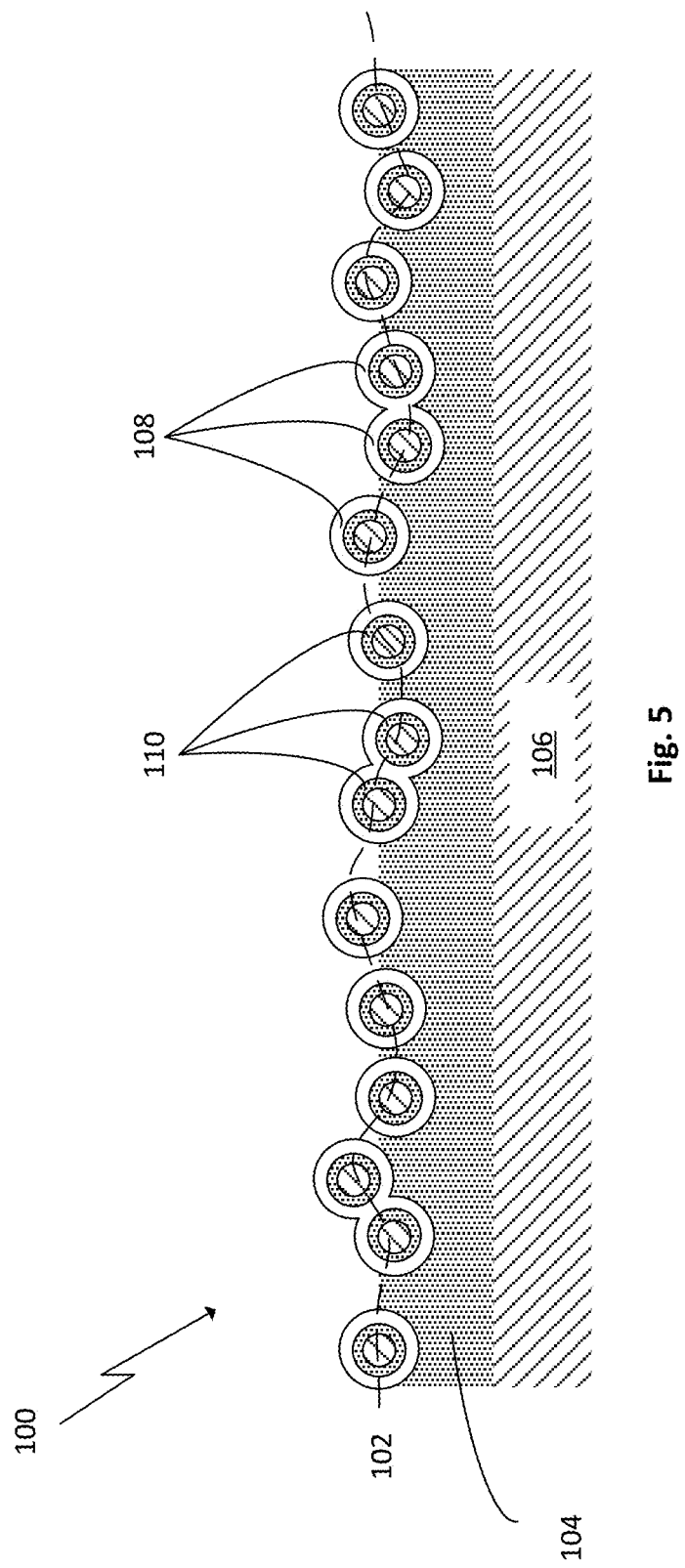

US 11,377,537 B2

MULTILAYER COMPOSITES COMPRISING ADHESIVE AND ONE OR MORE NANOFIBER SHEETS

TECHNICAL BACKGROUND

The present application is a continuation application under 35 U.S.C. § 111(a) of PCT Application No. US2016/051689 filed on Sep. 14, 2016, which claims priority to Japanese Patent Application No. 2015-180950 filed on Sep. 14, 2015, all of which are incorporated herein in their entireties.

FIELD OF THE INVENTION

The present disclosure relates to multilayer composites comprising adhesive and one or more nanofiber sheets that may optionally be metallized.

BACKGROUND

Glues and other types of adhesives generally have high electric resistivity and are therefore not particularly useful as electric conductors. Typically, in electronic and other devices having electrically conductive features, electric contact is severed or at least reduced in areas where adhesive is used.

SUMMARY

In one aspect, an adhesive nanofiber composite is provided, the composite comprising at least one at least one nanofiber sheet and a polymeric layer comprising an adhesive on the at least one sheet of nanofibers, wherein the adhesive nanofiber composite has an electric resistance of less than 10 Ω/square. The adhesive of the composite may be a pressure sensitive adhesive or may be selected from the group consisting of acrylics, polyurethanes, latexes, butyl rubbers, natural rubbers, styrene block copolymer, polyester, silicone, polyvinyl ester and combinations thereof. The adhesive of the composite may have an adhesive strength of between 2-30 N/25 mm on a stainless steel substrate. One nanofiber sheet or at least two nanofiber sheets may be included in the adhesive nanofiber composite. The composite may further include a metal deposited on the at least one nanofiber sheet. The metal may be selected from the group consisting of gold, silver, copper, aluminum and combinations thereof. The composite may further include a buffer layer between at least one nanofiber sheet and the metal, if present. The buffer layer may comprise a carbide-forming metal, such as titanium. If present, the buffer layer may have a coating thickness of less than 30 nm. The composite may also include a substrate on the polymeric layer. The substrate may be stretchable and/or deformable or not stretchable or deformable. The composite may or may not be stretchable. The composite may, in some embodiments, have a total thickness of less than 5 microns. A nanofiber sheet in the composite may have a thickness of less than 10 nm. The nanofiber sheet may include carbon nanotubes.

In another aspect, a metalized adhesive nanofiber composite is provided, the composite including at least one nanofiber sheet comprising carbon nanotubes, a metal layer on the at least one nanofiber sheet and an adhesive on the at least one nanofiber sheet, wherein the metal layer is in electrical contact with the carbon nanotubes of the nanofiber sheet. The adhesive of the composite may be selected from the group consisting of acrylics, polyurethanes, butyl rubbers, natural rubbers, styrene block copolymer, polyester, silicone, polyvinyl ester and combinations thereof. The metal of the composite may be selected from the group consisting of gold, silver, copper, platinum, nickel, tin, zinc, lithium, tungsten, aluminum, palladium and combinations thereof. The composite may also include a buffer layer between the at least one nanofiber sheet and the metal. The buffer layer may include a carbide-forming material, such as titanium.

In another aspect, a method of forming an adhesive nanofiber composite is provided, the method including providing at least one nanofiber sheet, infiltrating the nanofiber sheet with an adhesive solution comprising a solvent and removing the solvent from the nanofiber sheet to form the adhesive nanofiber composite. The method may also include metalizing the at least one nanofiber sheet. The method may also include forming a buffer layer on the nanofiber sheet prior to metallizing. In the method, removing the solvent may occur by evaporation. The nanofiber sheet may have a thickness prior to removing the solvent and a thickness after removing the solvent and the thickness after removing the solvent is at least 50% less than the thickness prior to removing the solvent. The nanofiber sheet may have a density of at least 0.015 g/cm$^3$.

BRIEF DESCRIPTION OF THE DRAWINGS

FIG. 5 shows an example adhesive nanofiber composite, in accordance with an example embodiment.

DETAILED DESCRIPTION

Overview

Figure 1:
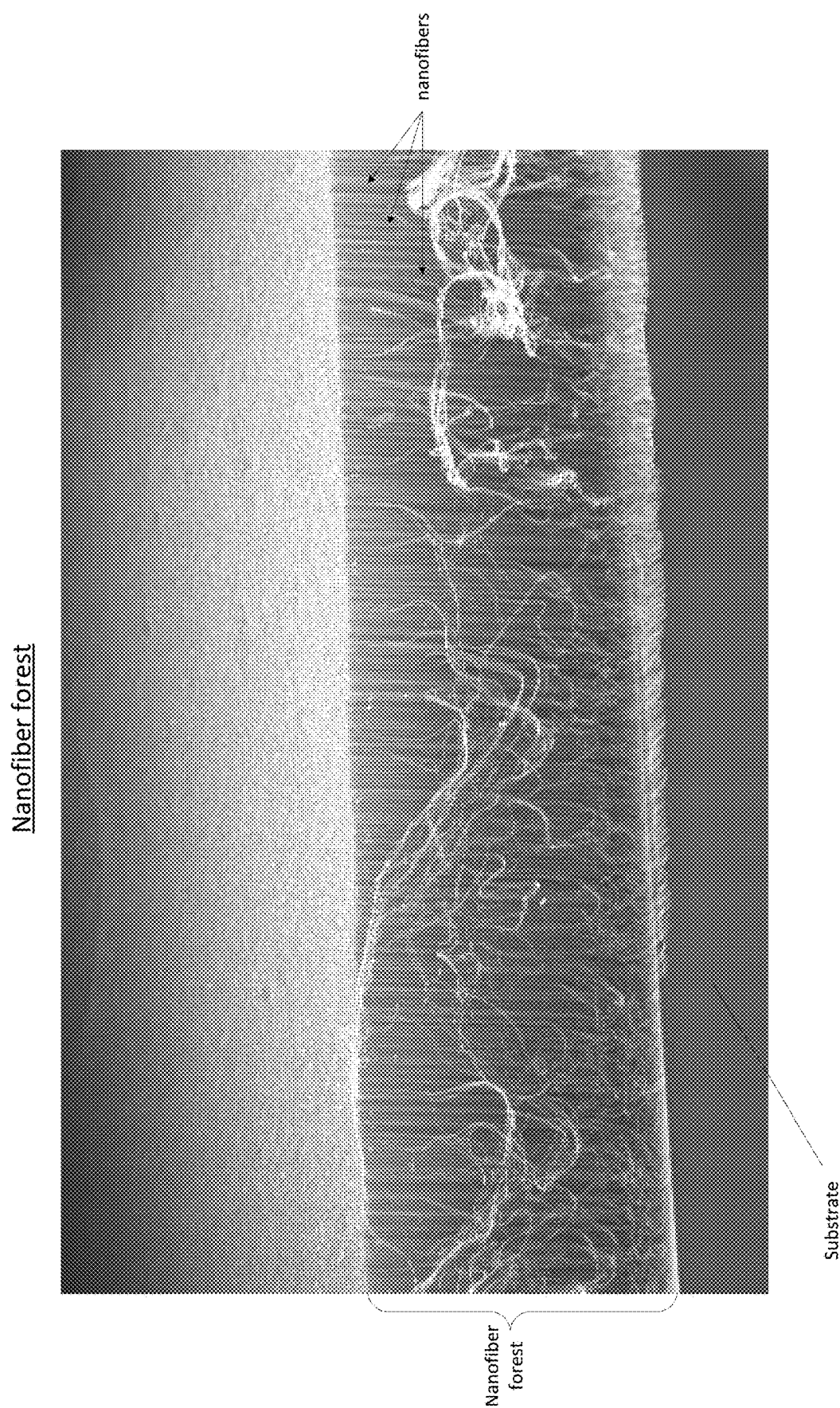
FIG. 1 illustrates an example forest of nanofibers on a substrate, in accordance with some example embodiments.

Multilayered composites that include one or more nanofiber sheets and an adhesive are disclosed herein. The disclosed "adhesive nanofiber composites" are highly conductive and may also be metallized, in some embodiments. The adhesive present in the disclosed composites need not fully cover all portions of the nanofiber sheet(s), and may leave a conductive portion of the sheet(s) accessible to other conductive features. In some example embodiments, the adhesive nanofiber composites may also be stretchable, depending on the desired configuration.

Adhesive nanofiber composites as disclosed herein may be used for numerous applications. For example, in some cases, an adhesive nanofiber composite may be used in conjunction with a conductive tape (e.g., a copper tape) to provide a conductive path from the conductive tape to an underlying substrate to which the tape is adhered via the adhesive nanofiber composite. In some embodiments, the disclosed adhesive nanofiber composites may be used as a grounding material. For example, adhesive nanofiber composites may be used to ground computer components. Given its flexible construction, an adhesive nanofiber composite can offer both low contact resistance and flexibility. Additionally, in some examples, the disclosed adhesive nanofiber composites may be used for electromagnetic shielding purposes. For example, adhesive nanofiber composites in accordance with the subject disclosure may, in some cases, be used as an EMI shielding seal between two shielding metal components. In some particular embodiments, an adhesive nanofiber composite may be used as a tape to seal joints of a container used to block electromagnetic radiation from electronics stored within. Such a configuration could prevent stray electromagnetic radiation from escaping through the joints of the container. In select embodiments, the disclosed adhesive nanofiber composites may be used as a thermally conductive material. In these and other embodiments, the disclosed adhesive nanofiber composite may be used as a heater, for example, by applying voltage across the material or irradiating at a wavelength absorbable by the nanofibers. In some such embodiments, electrodes may be attached directly to the adhesive nanofiber composite. The disclosed adhesive nanofiber composites may be used as a tape that is directly applied to a fully constructed device in some embodiments while in other embodiments, the disclosed adhesive nanofiber composites may be incorporated into a device during construction.

Properties of Carbon Nanofibers and Carbon Nanofiber Sheets

As used herein, the term "nanofiber" means a fiber having a diameter less than 1 μm. While the embodiments herein are primarily described as fabricated from carbon nanotubes, it will be appreciated that other carbon allotropes, whether graphene, micron or nano-scale graphite fibers and/or plates, and even other compositions of nano-scale fibers such as boron nitride may be used to fabricate nanofiber sheets using the techniques described below. As used herein, the terms "nanofiber" and "carbon nanotube" encompass both single walled carbon nanotubes and/or multi-walled carbon nanotubes in which carbon atoms are linked together to form a cylindrical structure. Multi-walled nanotubes have two or more walls. In some embodiments, carbon nanotubes as referenced herein have between 4 and 10 walls. As used herein, a "nanofiber sheet" or simply "sheet" refers to a sheet of nanofibers aligned via a drawing process (as described in PCT Publication No. WO 2007/015710, and incorporated by reference herein in its entirety) so that a longitudinal axis of a nanofiber of the sheet is parallel to a major surface of the sheet, rather than perpendicular to the major surface of the sheet (i.e., in the as-deposited form of the sheet, often referred to as a "forest").

The dimensions of carbon nanotubes can vary greatly depending on production methods used. For example, the diameter of a carbon nanotube may be from 0.4 nm to 100 nm and in some cases may be between 1 nm and 80 nm, between 10 and 70 nm, or between 20 and 50 nm. In some embodiments, the length of a carbon nanotube may range from 10 μm to greater than 55.5 cm and in some embodiments may be between 20 μm and 50 cm, o. Carbon nanotubes are also capable of having very high aspect ratios (ratio of length to diameter) with some as high as 132,000,000:1 or more. Given the wide range of dimensional possibilities, the properties of carbon nanotubes are highly adjustable, or tunable. While many intriguing properties of carbon nanotubes have been identified, harnessing the properties of carbon nanotubes in practical applications requires scalable and controllable production methods that allow the features of the carbon nanotubes to be maintained or enhanced.

Due to their unique structure, carbon nanotubes possess particular mechanical, electrical, chemical, thermal and optical properties that make them well-suited for certain applications. In particular, carbon nanotubes exhibit superior electrical conductivity, high mechanical strength, good thermal stability and are also hydrophobic. In addition to these properties, carbon nanotubes may also exhibit useful optical properties. For example, carbon nanotubes may be used in light-emitting diodes (LEDs) and photo-detectors to emit or detect light at narrowly selected wavelengths. Carbon nanotubes may also prove useful for photon transport and/or phonon transport.

While many intriguing properties of carbon nanotubes have been identified, harnessing the properties of carbon nanotubes in practical applications requires scalable and controllable production methods that allow the features of the carbon nanotubes to be maintained or enhanced. Methods and devices are disclosed herein that provide for the controlled assembly of carbon nanotubes in various configurations. For example, methods of assembling aligned carbon nanotubes on a substrate or in free-standing form are disclosed. In addition to other features, the disclosed methods allow carbon nanotubes to be successfully transferred without disrupting alignment, allow the density of the carbon nanotube configuration to be controlled and provide opportunity for optical tuning.

Nanofiber Forest

In accordance with various embodiments of the subject disclosure, nanofibers (including but not limited to carbon nanotubes) can be arranged in various configurations, including in a configuration referred to herein as a "forest." As used herein, a "forest" of nanofibers or carbon nanotubes refers to an array of nanofibers having approximately equivalent dimensions that are arranged substantially parallel to one another on a substrate. FIG. 1 shows an example forest of nanofibers on a substrate. The substrate may be any shape but in some embodiments the substrate has a planar surface on which the forest is assembled and in some embodiments, the planar surface may be flexible. As can be seen in FIG. 1, the nanofibers in the forest may be approximately equal in height and/or diameter.

In some embodiments, the nanofibers of the forest may each be oriented toward the substrate at approximately the same angle. For example, the nanofibers of the forest may be angled between 45° and 135° in relation to the substrate. In particular embodiments, the nanofibers of the forest may be oriented between 75° and 105° from the substrate and in select embodiments the nanofibers may be oriented approximately 90° from the substrate. As nanofibers are often not straight, the angle of a nanofiber with respect to the substrate is determined by measuring the angle between the plane of the substrate and a straight line connecting the proximal and distal ends of the nanofiber.

Nanofiber forests as disclosed herein may be relatively dense. Specifically, the disclosed nanofiber forests may have a density of at least 1 billion nanofibers/cm$^2$. In some specific embodiments, a nanofiber forest as described herein may have a density of between 10 billion/cm$^2$ and 30 billion/cm$^2$. In other examples, the nanofiber forest as described herein may have a density in the range of 90 billion nanofibers/cm$^2$. In some specific embodiments, a nanofiber forest as described herein may have a density of greater than $10^9$ nanofibers/cm$^2$, greater than $10^{10}$ nanofibers/cm$^2$, greater than $2 \times 10^{10}$ nanofibers/cm$^2$ or greater than $3 \times 10^{10}$ nanofibers/cm$^2$. In other embodiments, the density of the nanofiber forest in nanofibers/cm$^2$ can be between $10^9$ and $3 \times 10^{10}$ nanofibers/cm$^2$, between $10^{10}$ nanofibers/cm$^2$, between $3 \times 10^{10}$ nanofibers/cm$^2$, or between $10^{10}$ and $5 \times 10^{10}$ nanofibers/cm$^2$. The forest may include areas of high density or low density and specific areas may be void of nanofibers. The nanofibers within a forest may also exhibit inter-fiber connectivity. For example, neighboring nanofibers within a nanofiber forest may be attracted to one another by van der Waals forces.

Example Methods for Producing Nanofiber Forests

Various methods can be used to produce nanofiber forests in accordance with the subject disclosure. For example, in some embodiments nanofibers may be grown in a high-temperature furnace. In some such embodiments, catalyst may be deposited on a substrate, placed in a reactor and then may be exposed to a fuel compound that is supplied to the reactor. Substrates can withstand temperatures of greater than 800° C. to 1000° C. and may be inert materials. The substrate may comprise stainless steel or aluminum disposed on a underlying silicon (Si) wafer, although other ceramic substrates may be used in place of a Si wafer (e.g., alumina, zirconia, SiO$_2$ and glass ceramics. In examples where the nanofibers of the forest are carbon nanotubes, carbon-based compounds, including aliphatic hydrocarbons such as acetylene, methane and ethane may be used as a source of carbon atoms. After being introduced to the reactor, the carbon source(s) may then decompose and the resulting carbon atoms can accumulate on the catalyst and start assembling nanotubes by growing upward from the substrate to form a forest of nanofibers.

Figure 2:
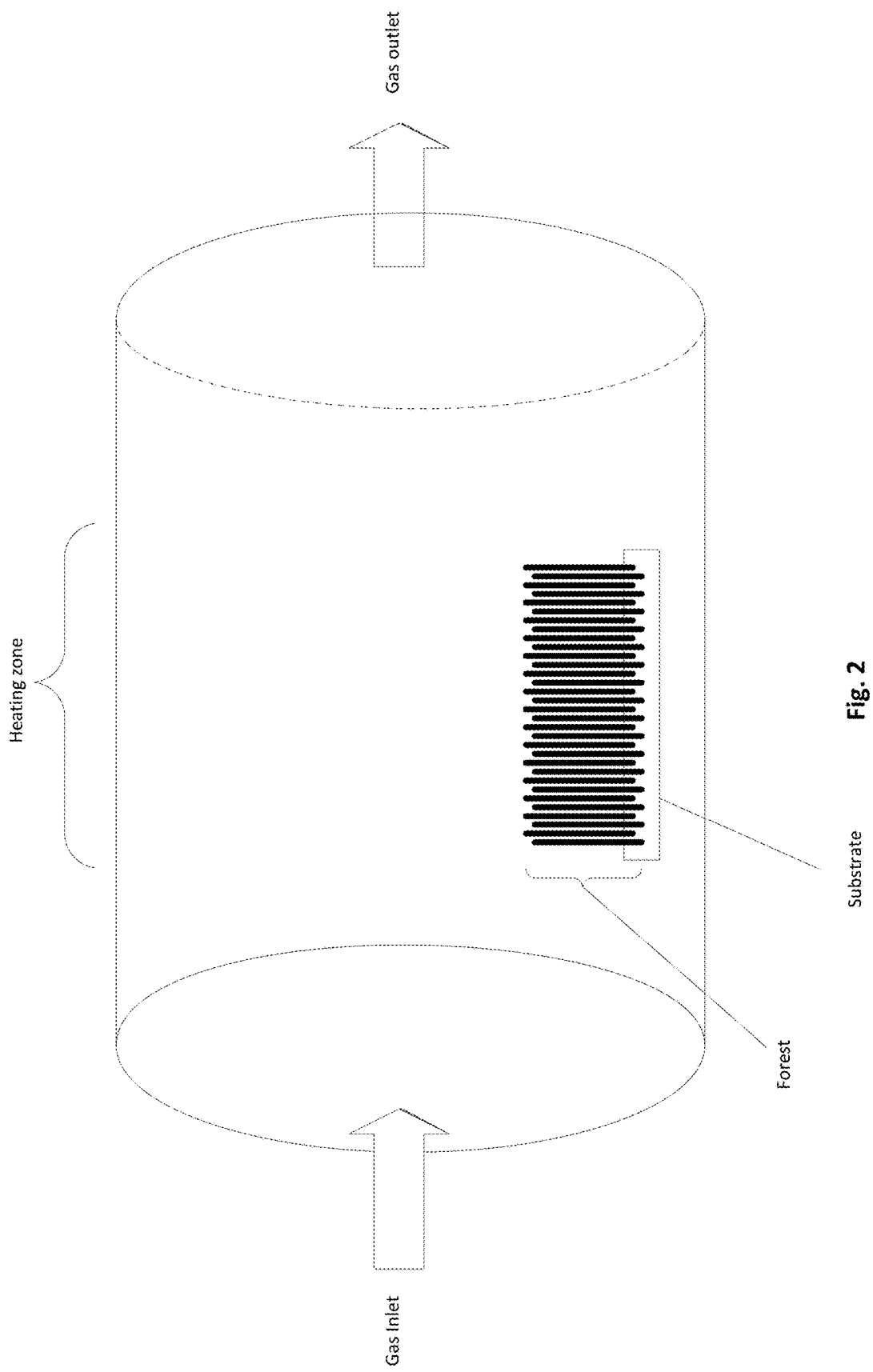
FIG. 2 is a schematic diagram of a reactor for growing nanofibers, in accordance with some embodiments.

A diagram of an example reactor for nanofiber growth is shown in FIG. 2. As can be seen in FIG. 2, the reactor may include a heating zone where a substrate can be positioned to facilitate nanofiber forest growth. The reactor also may include a gas inlet where fuel compound(s) and carrier gas(es) may be supplied to the reactor and a gas outlet where expended gases may be released from the reactor. Examples of carrier gases include nitrogen, hydrogen, argon and/or helium. Additionally, dopants to be incorporated in the nanofibers may be added to the gas stream. Example dopants include but are not limited to nitrogen and boron. Example methods of adding dopants during deposition of the nanofiber forest are described at paragraph 287 of U.S. Pat. No. 8,926,933, which is herein incorporated by reference in its entirety. Other example methods of doping or providing an additive to the forest include surface coating, dopant injection, or other deposition and/or in situ reactions (e.g., plasma-induced reactions, gas phase reaction, sputtering, chemical vapor deposition). Example additives include polymers (e.g., poly(vinyl alcohol), poly(phenylene terrapthalamide) type resins, poly(p-phenylene benzobisoxazole), polyacrylonitrile, poly(styrene), poly(ether etherketone) and poly(vinyl pyrrodidone, or derivations and combinations thereof), gases of elements or compounds (e.g., fluorine), diamond, palladium and palladium alloys, among others.

The reaction conditions during nanofiber growth can be altered to adjust the properties of the resulting nanofiber forest. For example, particle size of the catalyst, reaction temperature, gas flow rate and/or the reaction time can be adjusted as needed to produce a nanofiber forest having the desired specifications. In some embodiments, the position of catalyst on the substrate is controlled to form a nanofiber forest having desired patterning. For example, in some embodiments catalyst is deposited on the substrate in a pattern and the resulting forest grown from the patterned catalyst is similarly patterned. Exemplary catalysts include iron on a buffer layer of silicon dioxide (SiO$_2$) or aluminum oxide (e.g., Al$_2$O$_3$). Catalyst may be deposited on the substrate using any suitable method, including chemical vapor deposition (CVD), laser-assisted CVD, plasma-enhanced CVD, electron beam (eBeam) deposition, sputtering, thermal evaporation, electrochemical methods, or atomic layer deposition (ALD). To form a pattern, in some embodiments catalyst can be deposited in the form of the pattern and in others the catalyst can be removed or poisoned in specific areas to result in a pattern of nanotube fibers. Buffer layers may be applied to the substrate in a pattern as well and can be applied, for example, via coating, rolling, dipping, ink jet printing, pad printing or by using the physical or chemical deposition methods described above.

After formation, the nanofiber forest may optionally be modified. For example, in some embodiments, the nanofiber forest may be exposed to a treatment agent such as an oxidizing or reducing agent. In some embodiments, the nanofibers of the forest may optionally be chemically functionalized by a treatment agent. Treatment agent may be introduced to the nanofiber forest by any suitable method, including but not limited to physical deposition, atomic deposition, chemical vapor deposition (CVD) and/or liquid or gas infiltration. In some embodiments, the nanofiber forest may be modified to form a patterned forest. Patterning of the forest may be accomplished, for example, by selectively removing nanofibers from the forest. Removal can be achieved through chemical or physical means such as laser ablation.

Nanofiber Sheet

In addition to arrangement in a forest configuration, the nanofibers of the subject application may also be arranged in a sheet configuration. As used herein, the term "nanofiber sheet," "nanotube sheet," or simply "sheet" refers to an arrangement of nanofibers where the nanofibers are aligned substantially end to end in a plane. In some embodiments, a nanofiber sheet has a length and/or width that is more than 100 times greater than the thickness of the sheet. In some embodiments, the direction of nanofiber alignment may be continuous throughout an entire nanofiber sheet. In some embodiments, the length, width or both, are more than $10^3$, $10^6$ or $10^9$ times greater than the average thickness of the sheet. A nanofiber sheet can have a thickness of, for example, between approximately 5 nm and 20 µm, between 10 nm and 10 µm, between 20 nm and 100 nm, between 30 nm and 80 nm, or between 40 nm and 60 nm. A nanofiber sheet may have any length and width that are suitable for the intended application. In some embodiments, a nanofiber sheet may have a length of between 1 cm and 10 meters and a width between 1 cm and 1 meter. These lengths are provided merely for illustration. The length and width of a nanofiber sheet are constrained by the configuration of the manufacturing equipment and not by the physical or chemical properties of any of the nanotubes, forest, or nanofiber sheet. For example, continuous processes can produce sheets of any length. These sheets can be wound onto a roll as they are produced, and in some embodiments a release sheet can be rolled with the nanofibers sheets.

Figure 3:
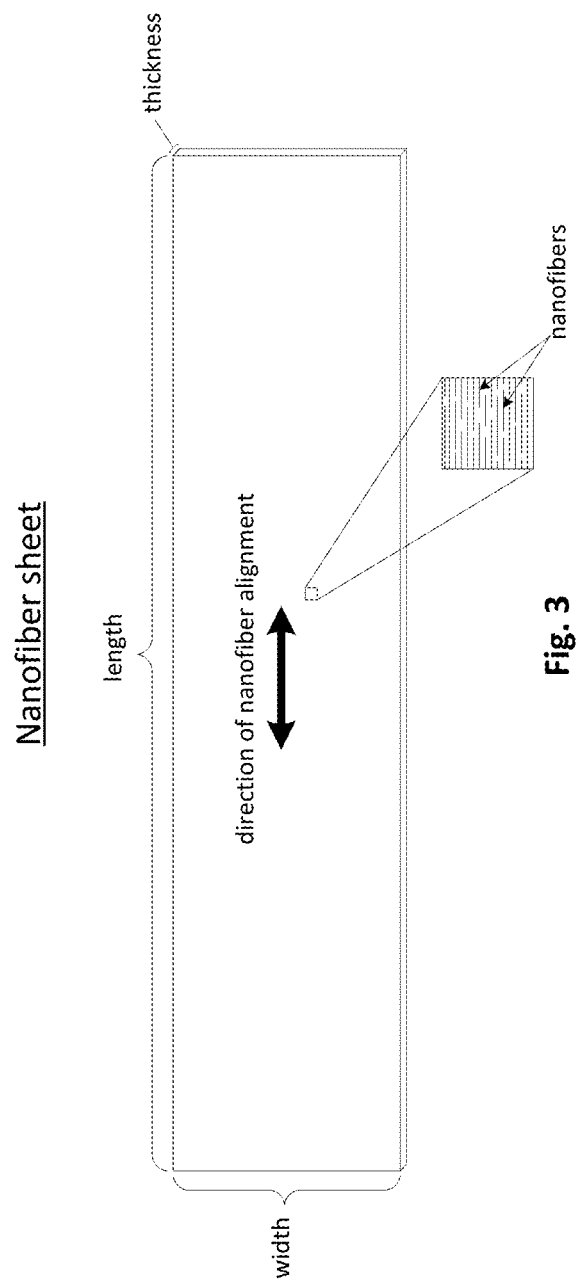
FIG. 3 is an illustration of a nanofiber sheet that identifies relative dimensions of the sheet and schematically illustrates nanofibers within the sheet aligned end-to-end in a plane parallel to a surface of the sheet, in accordance with some example embodiments.

An illustration of an example nanofiber sheet is shown in FIG. 3 with relative dimensions illustrated. As can be seen in FIG. 3, the axis in which the nanofibers are aligned end-to-end is referred to as the direction of nanofiber alignment. In some embodiments, the direction of nanofiber alignment may be continuous throughout an entire nanofiber sheet. Nanofibers are not necessarily perfectly parallel to each other and it is understood that the direction of nanofiber alignment is an average or general measure of the direction of alignment of the nanofibers.

After formation, a nanofiber sheet may optionally be physically or chemically modified. For example, in some embodiments, a nanofiber sheet may be exposed to a treatment agent such as an oxidizing or reducing agent. In additional embodiments, the nanofibers of the sheet may optionally be chemically functionalized by a treatment agent. Treatment agents can interact with the nanofibers via adsorbance or chemical bonding, such as covalent bonding.

Nanofiber sheets may be stacked on top of one another to form a multi-layered sheet. Nanofiber sheets may be stacked to have a common direction of nanofiber alignment or to have different directions of nanofiber alignment. Any number of nanofiber sheets may be stacked on top of one another to form a multi-layered nanofiber sheet. For example, in some embodiments, a nanofiber sheet may include 2, 3, 4, 5, 10, or more individual nanofiber sheets. The direction of nanofiber alignment on adjoining sheets may differ by less than 1°, less than 5° or less than 10°. In other embodiments, the direction of nanofiber alignment on adjoining sheets may differ by more than 40°, more than 45°, more than 60°, more than 80°, or more than 85°. In specific embodiments, the direction of nanofiber alignment on adjoining sheets may be 90°. The stacking of individual sheets at different angles may alter properties such as tensile strength and/or electrical conductivity.

Figure 4:
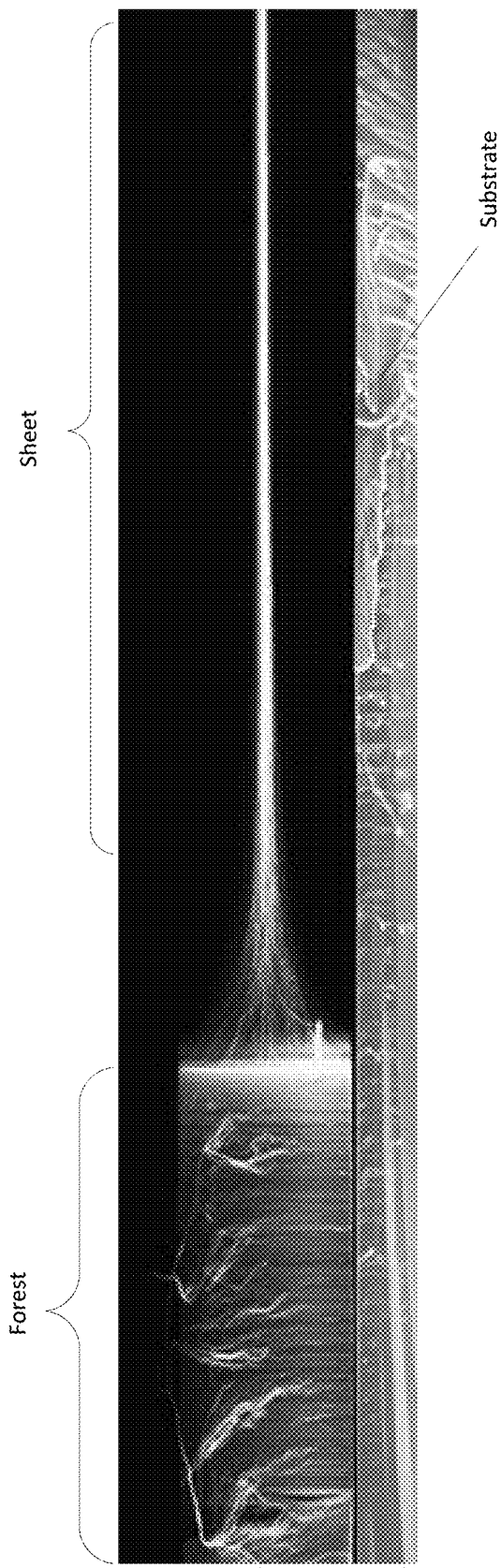
FIG. 4 is an image of a nanofiber sheet being laterally drawn from a nanofiber forest, in accordance with some example embodiments.
Figure 6A:
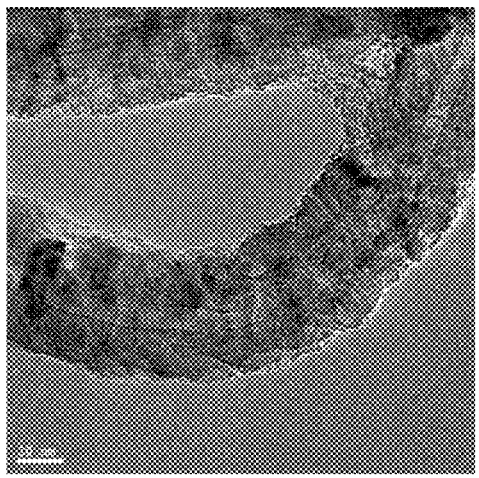
FIGS. 6A-6D are transmission electron microscope (TEM) images showing carbon nanofibers on which a buffer layer of titanium has been deposited, in accordance with an example embodiment.
Figure 6B:
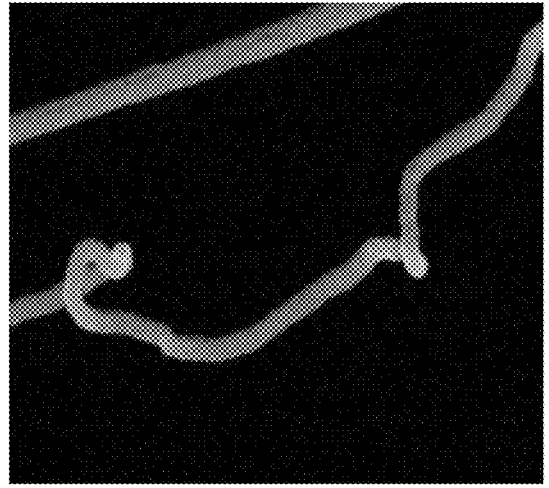
Figure 6C:
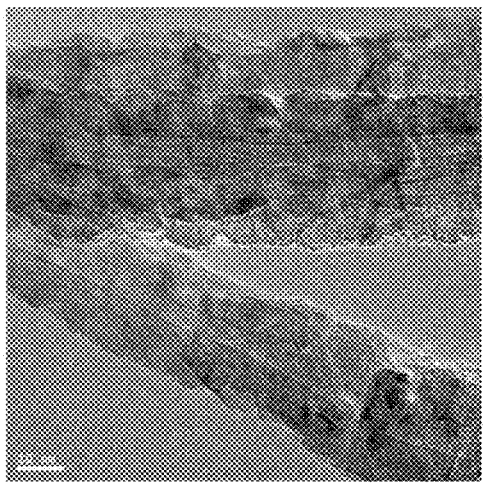
Figure 6D:
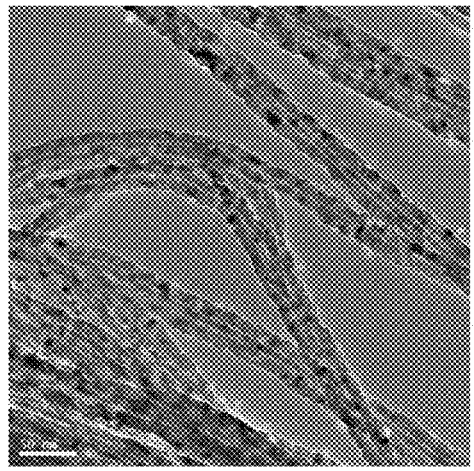
Figure 7B:
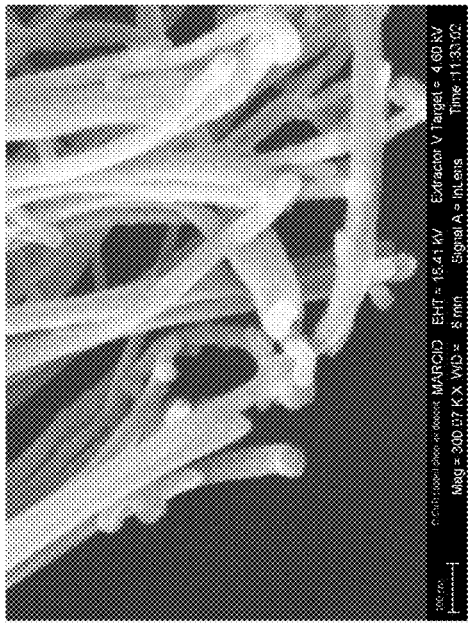
FIGS. 7A-7D are TEM images showing carbon nanofibers on which a buffer layer of titanium and a metal layer of copper have been deposited, in accordance with an example embodiment.
Figure 7D:
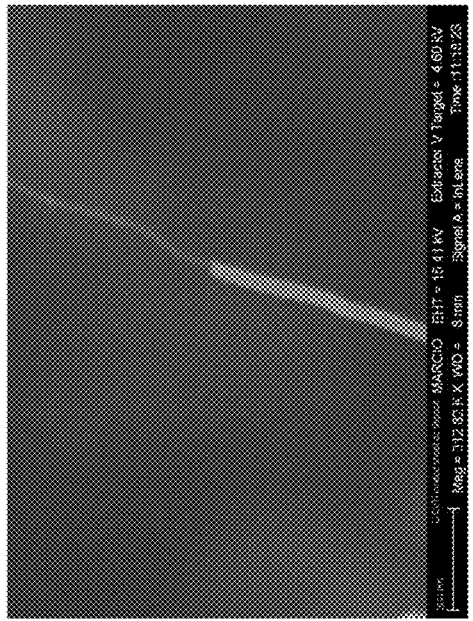
Figure 7A:
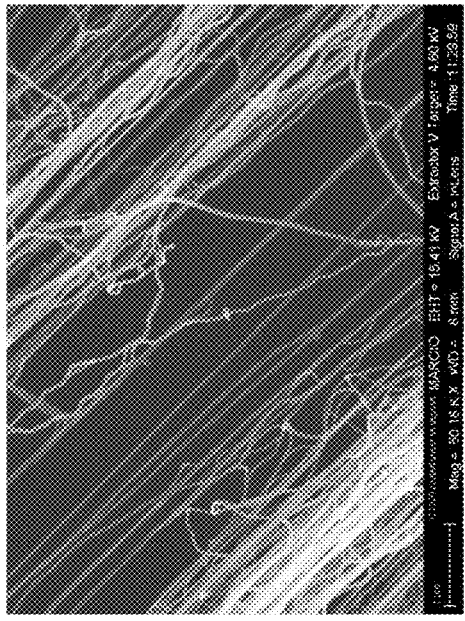
Figure 7C:
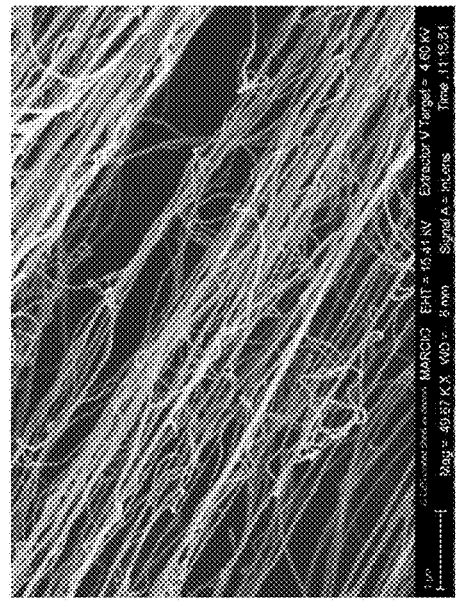

Nanofiber sheets may be assembled using any type of suitable process capable of producing the sheet. In some example embodiments, nanofiber sheets may be drawn from a nanofiber forest. An example of a nanofiber sheet being drawn from a nanofiber forest is shown in FIG. 4. As can be seen in FIG. 4, the nanofibers may be drawn laterally from the forest and then align end-to-end to form a nanofiber sheet. In embodiments where a nanofiber sheet is drawn from a nanofiber forest, the dimensions of the forest may be controlled to form a nanofiber sheet having particular dimensions. For example, the width of the nanofiber sheet may be approximately equal to the width of the nanofiber forest from which the sheet was drawn. Additionally, the length of the sheet can be controlled, for example, by concluding the draw process when the desired sheet length has been achieved. Carbon nanofiber sheets can be wound onto a roll for storage and shipment. In some cases, CNT sheets can be wound to a radius of less than 5 mm without damaging the sheet. Sheets can then be unwound from the rolls when needed.

After formation, nanofiber sheets may be subjected to one or more post-treatment processes. For example, in some embodiments, the nanofiber sheets may optionally be densified. Any appropriate densification method may be used to densify a nanofiber sheet, including but not limited to exposing the nanofiber sheet to a liquid and subsequently removing most or all of the liquid (e.g., by evaporation). A liquid may be introduced to the nanofiber sheet in a variety of ways, including, for example imbibing the liquid, exposing the sheet to an aerosol of a liquid, vapor condensation, coating, capillary absorbance, or combinations thereof. Liquids may be aqueous or non-aqueous and may be protic or aprotic solvents. Mixtures of two, three or more liquids may also be used. Densification may affect the thickness of the sheet. In some specific examples, a nanofiber sheet may have a thickness of between 10 and 20 µm prior to densification and after densification may have a thickness of between 10 to 50 nm. The volume density of a nanofiber sheet may be approximately 0.0015 $g/cm^3$ prior to densification and may increase by a factor of 360 after densification.

Using densification techniques, the volume density of various embodiments of a carbon nanotube sheet can be increased by a factor of greater than 10×, 20×, 50×, 100×, 500× or 1000×. Note that while the increase in volume density may in some embodiments be great, the accompanying increase in areal density may be zero or close to zero. This means that a densified sheet can have essentially the same length and width as the native sheet from which it was densified. In various embodiments, densification can result in areal shrinkage of less than 10%, less than 5% or less than 1%.

Nanofiber sheets have many properties that can be exploited for various applications. For example, nanofiber sheets may have tunable opacity, high mechanical strength and flexibility, thermal and electrical conductivity, and may also exhibit hydrophobicity. Given the high degree of alignment of the nanofibers within a sheet, a nanofiber sheet may be extremely thin, rendering it nearly two-dimensional. In some examples, a nanofiber sheet is between 10 and 200 nm thick (as measured within normal measurement tolerances). These thicknesses can be completely transparent to visible light in the wavelength range of 390 to 750 nm. The sheets may also be transparent to many other wavelengths of electromagnetic radiation. As used herein, a product is transparent to a wavelength or range of wavelengths if it transmits more than 95% of incident radiation of that wavelength. In some embodiments, the inclusion of nanofiber sheets may only add minimal additional area and/or volume to a component or surface. Nanofiber sheets as disclosed herein may also have high purity, wherein more than 90%, more than 95% or more than 99% of the weight percent of the nanofiber sheet is attributable to nanofibers, in some instances. Similarly, the nanofiber sheet may comprise more than 90%, more than 95%, more than 99% or more than 99.9% by weight of carbon. The nanofibers and sheets may be void of aliphatic carbon and may be exclusively aryl structures forming single and/or multi-walled tubes, including those comprising two, three, four, five or more than five walls. The nanotubes, in various embodiments, can include armchair, zig-zag and/or chiral structures. In some embodiments, a nanofiber sheet may have an electric resistance of 650 to 1200 Ohms/square, while in other embodiments, a nanofiber sheet metallized with a metal (e.g., gold, platinum, copper or other high work function metal having a work function above about 3.5 eV) may have a sheet resistance of as low or lower than 100 Ohm/square.

Adhesive Nanofiber Composites

Adhesive nanofiber composites, as disclosed herein, may be formed of one or more nanofiber sheets and a polymer. In some embodiments, the polymer includes or is an adhesive. A top perspective view of an example adhesive nanofiber composite 100 that includes one nanofiber sheet 102 is shown in FIG. 5. Although FIG. 5 includes one nanofiber sheet, any number of nanofiber sheets may be included in adhesive nanofiber composite 100, such as one, more than one, more than 5, more than 10, more than 15, or more than 20. In some embodiments, the adhesive nanofiber composite includes between 1 and 20 or between 5 and 25 nanofiber sheets. Multiple nanofiber sheets 102 may be aligned with one another or may have dissimilar directions of alignment. For example, in some embodiments, nanofiber sheets 102 may be positioned to have parallel alignment direction of nanofibers. However, in other embodiments, nanofiber sheets 102 may be positioned with the alignment direction of the nanofibers oriented at an angle. For example, adjacent nanofiber sheets may be positioned with nanofiber alignment direction at an angle of at least 1°, at least 5°, at least 10°, at least 15°, at least 20°, at least 25°, at least 45°, at least 60° or at least 85° from one another.

The example adhesive nanofiber composite shown in FIG. 5 also includes polymer 104, buffer layer 110 and metal 108 on removable substrate 106. Buffer layer 110 can be, for example, a carbide-forming metal such as titanium that provides for greater adhesion of metal layer 108 to the nanofibers. As shown in FIG. 5, polymer 104 may be directly adjacent to nanofiber sheet 102. Although shown as a distinct layer in FIG. 5, polymer 104 may penetrate at least a portion of nanofiber sheet 102 and fill voids between the nanofibers. For example, in some embodiments, nanofiber sheet 102 is porous and polymer 104 extends into pores between the nanofibers of the nanofiber sheet 102. The polymer can also function as a densifying agent. In these and other embodiments, a portion of nanofiber sheet 102 is not completely insulated by polymer 104 and at least portions of the nanofiber layer may be exposed to a conductive material, thereby allowing the adhesive nanofiber composite to be conductive.

Any type of polymeric or non-polymeric material that possesses adhesive properties may be used to form polymer 104 of the adhesive nanofiber composites as disclosed herein. For example, in some embodiments, an adhesive having an adhesive strength of between 1 and 50N/25 mm as measured on stainless steel according to ASTM D903 and/or JISZ0237n may be used to form an adhesive nanofiber composite. In some particular embodiments, an adhesive having an adhesive strength of between 1 and 30N/25 mm or between 1 and 20 N/25 mm is used to form an adhesive nanofiber composite. In some embodiments, non-reactive adhesives or reactive adhesives may be used. Example non-reactive adhesives that may be used include, but are not limited to, drying adhesives (e.g., solvent-based or emulsion adhesives), pressure-sensitive adhesives, contact adhesives, and/or heat-sensitive adhesives. Example reactive adhesives that may be used include one-part adhesives and multi-part adhesives. In some particular embodiments, a medical grade adhesive may be used. Example adhesives that may be used include rubbers, epoxies, polyimides, acrylics, silicones, polyesters, polyvinyl esters, polyvinyl acetates, polyurethanes, polyvinyl ethers, and/or styrenic polymers. For example, in some particular embodiments, ethylene-vinyl acetate, polyvinyl ester, butyl rubber, natural rubber, polychloroprene, styrene block co-polymers and/or polyester may be used as adhesives. In some embodiments, an adhesive may be used that is capable of multiple applications to one or more surfaces. An adhesive capable of at least two, three, four, or five applications, without losing tack, may be used.

Adhesive nanofiber composite 100 may include a removable substrate 106, as shown in FIG. 5. Removable substrate 106 may be formed of any suitable material, including both rigid and non-rigid materials. For example, removable substrate 106 may be formed of a polymeric material, including natural and synthetic rubber, latex, polypropylene, polyethylene, and/or silicone. In some particular embodiments, removable substrate 106 may be stretchable. Particular types of polymer 104 and removable substrate 106 may be selected to possess desired adhesion strength, in some embodiments. For example, polymer 104 and substrate 106 may be selected to be removable from one another without damaging the composite and/or without leaving adhesive residue on the substrate.

Polymer 104 of adhesive nanofiber composite 100 may also include one or more additives, in some embodiments. For example, polymer 104 may also include crosslinking agents, rheology modifiers, ceramics, fillers, dyes, and/or pigment. Example crosslinking agents that may be used include epoxy, isocyanate, aziridine and/or metal chelates. In some cases, electrical or thermal conductivity improvers such as carbon species, including carbon black, graphene, diamond, carbon nanotubes, fullerenes and amorphous carbon, metal oxides, and/or metal particles may be added. In some particular embodiments, titanium dioxide, lithium ion phosphate and/or magnesium diboride may be added. Odor emitting and/or odor absorbing additives may also be used, as desired.

In some embodiments, adhesive nanofiber composite 100 may be metallized, as shown in FIG. 5. In metalized adhesive nanofiber composites, metal 108 may conformally coat the exterior surface of nanofibers in nanofiber sheet(s) 102, as shown in FIG. 5. Various types of metal may be applied to nanofiber sheet 102, such as silver, gold, copper, nickel, palladium, platinum, aluminum, iron, tin, zinc, titanium, zirconium, hafnium, vanadium, niobium, tantalum, chromium, lithium, tungsten, or other conductive metals. In embodiments where the adhesive nanofiber composite 100 is metallized, metal 108 may be applied individually to each nanofiber sheet 102 included in adhesive nanofiber composite 100 or the metal may be applied to a stacked arrangement of nanofiber sheets. As discussed in detail with respect to FIGS. 9A-9C, in some embodiments where metal is deposited on an outer nanofiber sheet of a stacked arrangement or nanofiber sheets, the metal may penetrate through at least one nanofiber sheet, at least partially coating the nanofibers in the underlying nanofiber sheet(s). If present, metal layer 108 may, in some embodiments, have a thickness of between 2 nm and 300 nm. In some particular embodiments, the metal layer, if present, may have a coating thickness of between 50 and 250 nm. The metal layer can provide electrical continuity between nanofibers and between the nanofiber sheet and an external contact such as an electrode, power source or ground.

In some embodiments where adhesive nanofiber composite 100 is metallized, a buffer layer may also be present between the nanofiber sheet and the metal. An example metallized adhesive nanofiber composite 100c including a buffer layer 110 is shown in FIG. 5. If present, buffer layer 110 may be any suitable thickness and in some embodiments may have a thickness of less than 30 nm, less than 20 nm, less than 10 nm, between 2 nm and 8 nm, and/or approximately 5 nm in some embodiments. Buffer layer 110 may enhance adhesion between the nanofiber sheet 102 and metal 108 and may improve electrical conductivity between the nanofiber sheet 102 and the metal 108. Buffer layer 110 may be formed of any appropriate material and may have an affinity for carbon. Materials such as a carbide-forming metals have been found to function well as buffer layers. For instance, in some embodiments a thin layer of titanium metal may be applied prior to application of metal layer 108 and metal layer 108 adheres to the buffer layer 110 whereas it may not adhere directly to the nanofibers themselves. The buffer layer can be applied using the same or similar techniques to those used to apply the metal layer.

FIGS. 6A-6D are images captured using Transmission Electron Microscopy (TEM) that show carbon nanotubes onto which a buffer layer of titanium is disposed. In the examples shown, the titanium buffer layer was deposited on the nanotubes using eBeam deposition and the titanium buffer layer is approximately 3 nm thick.

In one particular example embodiment, metal was deposited onto a nanofiber sheet using an electron beam evaporation system from CHA Industries ("CHA Mark 50" model) of Fremont, Calif. The deposition was performed at an operating voltage of approximately 10 kW (approximated by normal measuring tolerances due to measurement discrimination, accuracy and precision) in a vacuum of from approximately $10^{-6}$ to approximately $10^{-7}$ torr (approximated by normal measuring tolerances due to measurement discrimination, accuracy, and precision). The eBeam deposition system was equipped with a turret that allowed changing between deposition metals automatically. Samples were attached to the dome-shape sample holder following the curvature of the dome to assure uniformity of the metal layer throughout the sample. The deposition rates of titanium and then silver were kept constant by a deposition controller at levels around 0.5 Å/s and 10 Å/s, respectively. The titanium thin film deposited was from 3 to 20 nm thick and the silver metal was between 400 nm and 500 nm thick.

In a separate example from the experimental example described above, FIGS. 7A-7D show TEM images of a metal layer of copper that is approximately 60 nm thick (approximation due to normal process variation) disposed over a buffer layer of titanium deposited using eBeam deposition. The combination of the buffer layer of titanium and the metal layer of copper, as embodied in the examples shown in these figures, produced a nanofiber sheet with a resistance of approximately 5 Ohms/square (within normal measurement tolerances).

Figure 8:
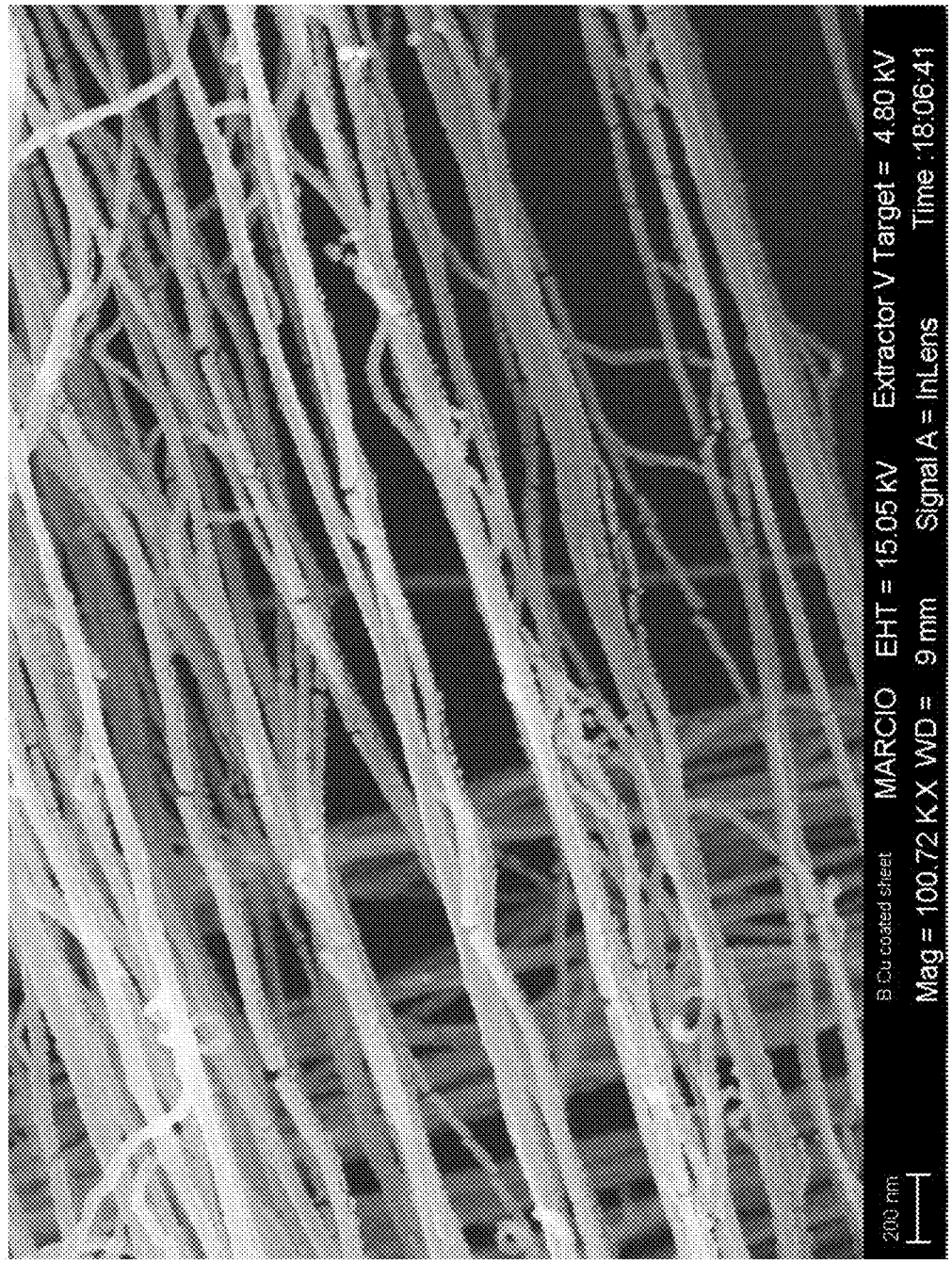
FIG. 8 is a TEM image showing carbon nanofibers on which a conformal layer of copper has been deposited, without a buffer layer of a carbide-forming metal between the carbon nanofiber and the copper layer.

The morphology of the examples in FIGS. 7A-7D is in contrast to the morphology of other examples in which the buffer layer of a carbide-forming metal is absent. As shown in the TEM image of FIG. 8, an approximately 60 nm thick copper layer has been conformally deposited on the nanofibers using eBeam deposition without an underlying carbide-forming buffer layer. As shown, the non-carbide-forming copper conformal metal layer has many discontinuities. This morphology had an impact on electrical properties as well. In particular, the resistance of the embodiment shown in FIG. 8 was measured to be 1790 Ohms/square, which is nearly 600 times greater than the resistance measured for the embodiments shown in FIGS. 7A-7D.

Figure 9A:
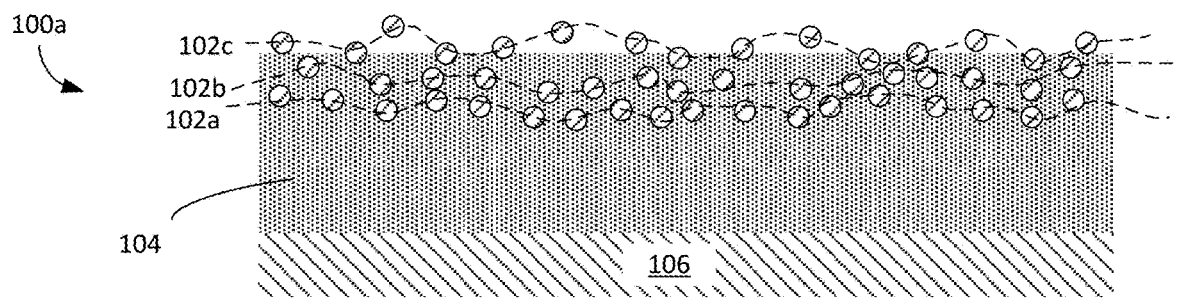
FIGS. 9A-9C show exemplary adhesive nanofiber composites, in accordance with some example embodiments.
Figure 9B:
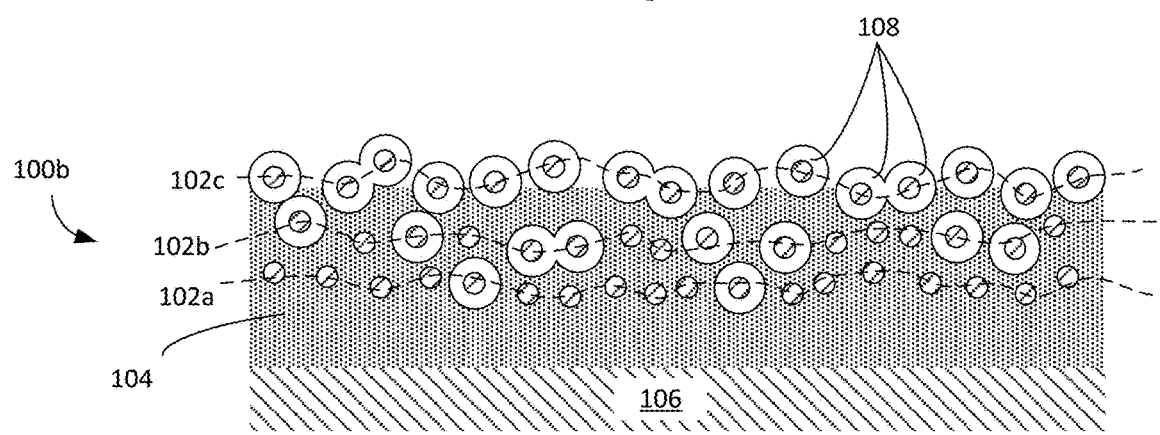
Figure 9C:
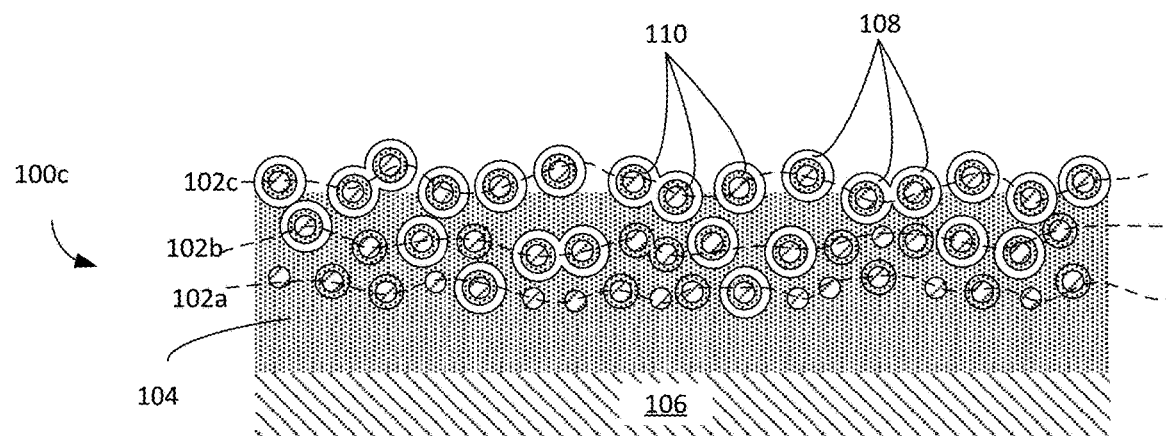

FIGS. 9A-9C shows example adhesive nanofiber composites 100a and 100c that each include more than one nanofiber sheet 102. Specifically, the example adhesive nanofiber composites shown in FIGS. 9A-9C each include three nanofiber sheets 102a, 102b and 102c. For consistency and ease of understanding of the present disclosure, adhesive nanofiber composites 100a-100c hereinafter may be collectively referred to generally as adhesive nanofiber composites 100, except where separately referenced.

FIG. 9A shows an example adhesive nanofiber composite 100a that is not metallized. An example metallized adhesive nanofiber composite 100b is illustrated in FIG. 9B. As the nanofiber sheets 102 may possess porosity, when a metal is deposited on a stacked arrangement of nanofiber sheets, metal may accumulate both on the topmost nanofiber sheet (e.g., nanofiber sheet 102c in the embodiment shown in FIG. 9B) and underlying nanofiber sheets (e.g., nanofiber sheets 102b and 102a in the embodiment shown in FIG. 9B). In some such embodiments, the thickness of the metal in the topmost nanofiber sheet may be greater than the thickness of the metal in any underlying nanofiber sheets. As will be appreciated in light of this disclosure, the extent of metal permeation to underlying nanofiber sheets may depend, in some cases, on the type of metal deposition technique used. FIG. 9C shows an example adhesive nanofiber composite 100c that is metallized and includes buffer layer 110. As shown in FIG. 9C, if present, buffer 110 may be formed on an outer nanofiber sheet, for example, nanofiber sheet 102c and underlying nanofiber sheet(s), if present. Numerous configurations and alternatives will be apparent in light of this disclosure.

In some embodiments, the adhesive nanofiber composite may be stretchable. For example, in some embodiments, an adhesive nanofiber composite may be formed on a substrate that is elastic or otherwise stretchable. In some such embodiments, one or more nanofiber sheets may be disposed on a substrate that has been strained in one or more than one direction simultaneously (e.g., isotropically as though on an expanding sphere). In some embodiments, the deformable substrate may be stretched at least 50%, at least 75%, at least 100%, at least 150%, at least 200%, at least 250%, at least 300%, at least 400%, at least 500%, at least 600%, at least 700%, at least 800%, at least 900%, or at least 1000% before the nanofiber sheet(s) are positioned on the substrate. The deformable substrate may be stretched in one or more than one direction. For example, the substrate may be stretched in at least two directions when the nanofiber sheet(s) are positioned on the substrate.

Straining or stretching the elastic substrate enables the nanofiber sheet or composite comprising nanofiber sheets to "buckle" when the strain on the elastic substrate is released (i.e., the substrate is "relaxed" or allowed to contract to a "contracted state" from its elastically strained or "extended" state) after additional processing that is described below. Buckling the nanofiber composite "stores" additional surface area of the nanofiber sheet, facilitating repeated subsequent elastic extensions of both the elastic substrate and the nanofiber sheet disposed on the elastic substrate, without damaging the nanofiber sheet. Thus, the composite is able to stretch because of the structure of the sheet, not due to any elasticity of the fibers themselves. In some embodiments, the composite may be formed as a waveform structure travelling along a single direction in a plane of the adhesive nanofiber composite. Specifically, for example, the one or more nanofiber sheets may be folded to form a waveform structure so as to orient the wave travelling direction in a single direction along a surface of the composite (a plane orthogonal to the sheet thickness direction). An adhesive nanofiber composite forming a waveform structure may also herein be referred to as a "waveform carbon nanotube aggregate." As used herein, the expression "a carbon nanotube aggregate forms a waveform structure" means that a nanofiber sheet in the adhesive nanofiber composite exhibits a wavy form in which peaks and valleys with different or the same dimensions appear irregularly or periodically.

Figures 10A, 10B:
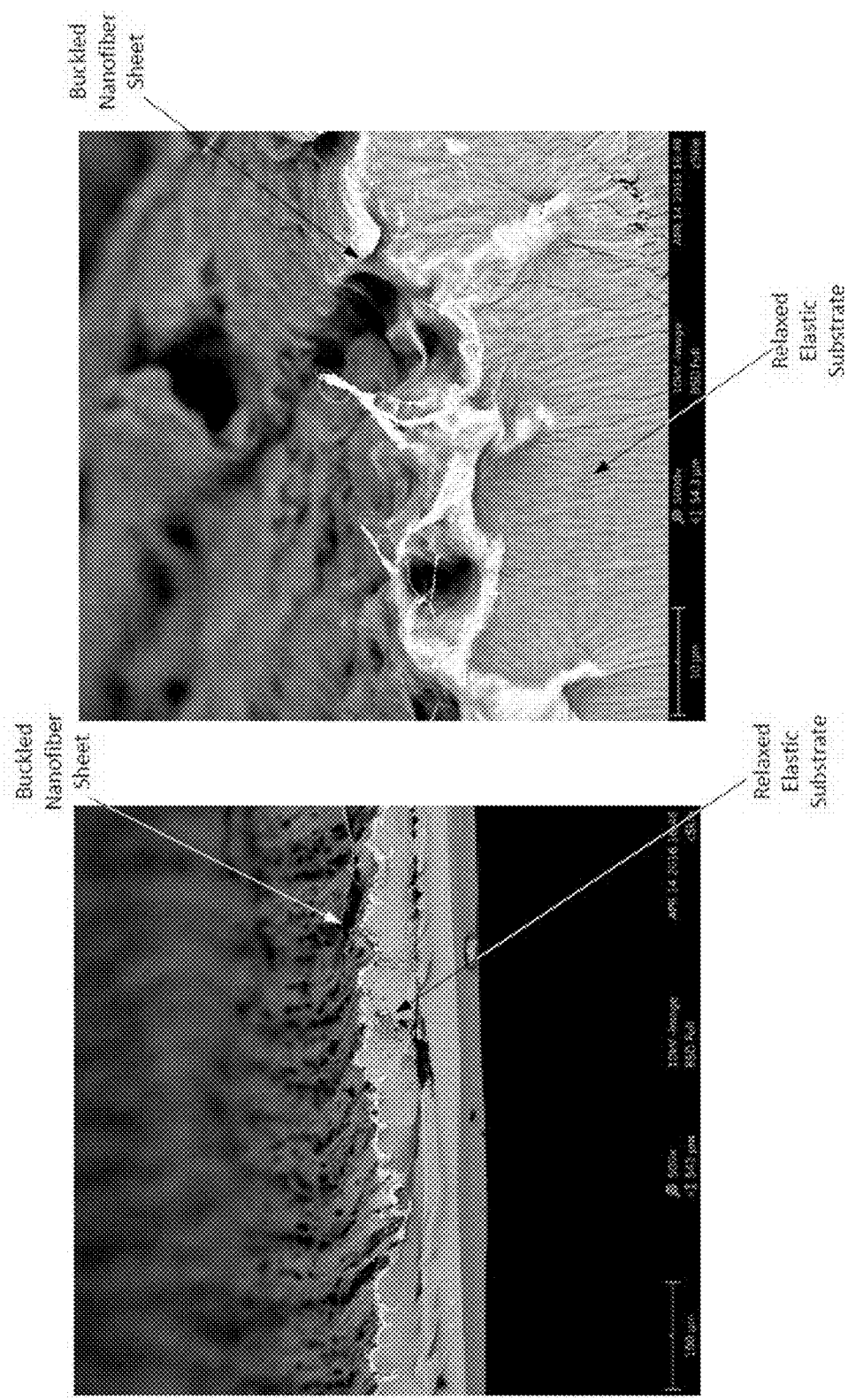
FIGS. 10A and 10B are cross-sectional SEM images showing a metallized adhesive nanofiber composite disposed on an elastic substrate, the nanofiber sheet having a buckled surface, in accordance with an example embodiment.

FIGS. 10A and 10B are cross-sectional views of an example stretchable adhesive nanofiber composite captured using a scanning electron microscope (SEM). FIGS. 10A and 10B show nanofiber sheets of a metalized adhesive nanofiber composite in a buckled, or unstretched position. As is shown, the adhesion between the nanofiber sheet and the underlying elastic substrate is sufficient to maintain contact between the nanofiber sheet and the elastic substrate even in a buckled (unstretched) conformation. In some embodiments, the elastic substrate is an adhesive. In various embodiments, a nanofiber composite may be stretchable by a factor of many times its initial length and or width. For example, in some particular embodiments, the nanofiber composite may be stretched in one or more directions by at least 50%, at least 75%, at least 100%, at least 150%, at least 200%, at least 250%, at least 300%, at least 400%, at least 500%, at least 600%, at least 700%, at least 800%, at least 900%, or at least 1000% without breaking. In some embodiments, these same sheets will return to their original lengths after the stretching force is relieved.

In some embodiments, the adhesive nanofiber composite may also include one or more additional layers. For example, in some embodiments an additional polymeric layer may be included in the adhesive nanofiber composite. If present, an additional polymeric layer may comprise adhesive and may be positioned on an opposite side of the nanofiber sheet(s) as polymer 104. Numerous configurations and variations will be apparent in light of this disclosure.

The disclosed nanofiber composites may possess various features and properties. For example, the adhesive nanofiber composite may have low electrical resistance, in some embodiments. Specifically, in some embodiments, the electrical resistance of an example adhesive nanofiber composite may be less than 1 Ω/square and in some cases may be less than 0.9 Ω/square, less than 0.8 Ω/square, less than 0.7 Ω/square, less than 0.6 Ω/square, less than 0.5 Ω/square, or less than 0.1 Ω/square. The disclosed nanofiber composites may have any desired thickness. For example, in some embodiments, the disclosed nanofiber composites have a thickness of: less than 1 micron, less than 0.5 microns, less than 0.2 microns, less than 0.1 microns, less than 50 nm, less than 40 nm, or less than 30 nm. The ratio of nanofiber sheets to adhesive may be, by volume, less than 1:5, less than 1:10, less than 1:100 or less than 1:1000. The ratio of nanofibers sheet to adhesive may be, by mass, less than 1:5, less than 1:10, less than 1:100, less than 1:1,000 or less than 1:10,000.

Example Methods of Producing Adhesive Nanofiber Composites

Figure 11:
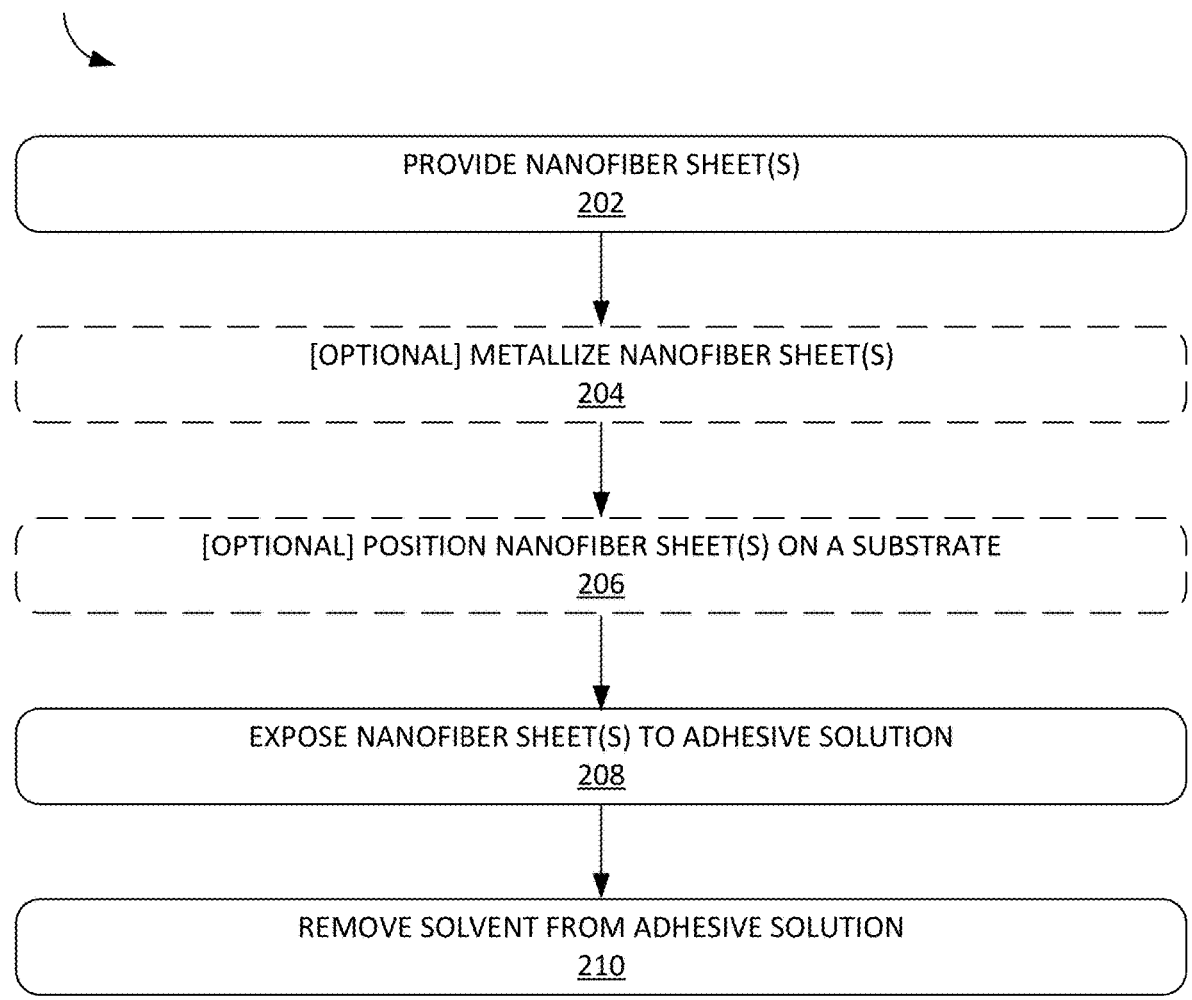
FIG. 11 is a method flow diagram illustrating an example method for fabricating an adhesive nanofiber composite, in accordance with some example embodiments.

Adhesive nanofiber composites 100 may be produced by any suitable technique, including by the techniques described herein. FIG. 11 illustrates an example method 200 that may be used to form adhesive nanofiber composites 100. As shown in FIG. 11, method 200 includes providing 202 nanofiber sheet(s) and optionally metallizing 204 the nanofiber sheet(s). Nanofiber sheets may be metallized by any known technique, including but not limited to chemical vapor deposition (CVD), pressure assisted chemical vapor deposition (PCVD), electron beam (eBeam) deposition, sputtering, atomic layer deposition (ALD), and/or electroplating. The nanofiber sheets may be metallized individually or while in a stacked arrangement of more than one nanofiber sheet, in some embodiments. In some such embodiments where a stacked arrangement of nanofiber sheets is metallized, the metal may be deposited not only on the topmost nanofiber sheet but also on one or more underlying nanofiber sheets. In some embodiments, more than one metal layer may be deposited on the nanofiber sheet(s). In embodiments where the adhesive nanofiber composite is metallized, a buffer layer may be deposited on the nanofiber sheet(s) prior to deposition of the metal. In some such embodiments, a buffer layer may be deposited using any technique used to metallize the nanofiber sheet, including CVD, PCVD, eBeam deposition, sputtering, ALD and/or electroplating. In various embodiments, the buffer layer can improve adhesion, wear, electrical conductivity and/or reflectivity. Any material described herein with respect to buffer layer 110 may be used to form the buffer layer.

Method 200 continues with optionally positioning 206 the nanofiber sheet(s) on a substrate. In some embodiments, the nanofiber sheet(s) may be placed on a substrate that is deformable and/or stretchable as previously described herein. In embodiments where a deformable or stretchable substrate is used, the nanofiber sheet(s) may be positioned on the substrate when the substrate is deformed or stretched. In embodiments where the nanofiber composite is formed on a stretchable or deformable substrate, the resulting nanofiber composite may be stretchable. In some particular embodiments, a nanofiber composite formed on a stretched substrate may be able to be stretched approximately as much as the substrate was stretched during formation of the composite. For example, in some embodiments a substrate may be stretched approximately 700% while a nanofiber composite is formed on the stretched substrate and the resulting nanofiber composite may be able to be stretched approximately 700% without breaking.

In some embodiments, the substrate may be substantially planar while in other embodiments the substrate may be non-planar. For example, in some embodiments the substrate may include ridges and/or indentations. In these and other embodiments, the substrate may be curved, conical, spherical or cylindrical. It will be understood in light of this disclosure that in some embodiments the adhesive nanofiber composite may adopt the shape of the underlying substrate. For example, when an adhesive nanofiber composite is formed on a spherical substrate, the resulting adhesive nanofiber composite may be spherical, in some embodiments.

Method 200 continues with exposing 208 the nanofiber sheet(s) to one or more adhesives. In some embodiments, an adhesive is applied to the nanofiber sheet(s) as a solid adhesive film, while in other embodiments an adhesive may be applied to the nanofiber sheet(s) as an adhesive solution or dispersion. In embodiments where a solid adhesive film is applied to the nanofiber sheet(s), the solid adhesive film may be directly adhered to a nanofiber sheet. In some embodiments, more than one adhesive film may be used. In some such embodiments, a first adhesive film may be positioned between adjacent nanofiber sheets and a second adhesive film may be adhered to an outer surface of one of the nanofiber sheets or may be adhered to a separate nanofiber sheet. In some select embodiments, adhesive nanofiber films are positioned between each nanofiber sheet of the nanofiber composite. Example adhesive films that may be used include but are not limited to films comprising acrylics, polyurethanes, butyl rubbers, natural rubbers, styrene block copolymer, polyester, silicone, polyvinyl esters, and combinations thereof. The adhesive film(s) may adhere to the nanofiber sheet(s) upon contact or may undergo treatment to adhere or enhance adhesion. For example, in some embodiments, the nanofiber sheet(s) and adhesive film(s) may be pressed together and/or heated to promote adhesion.

In embodiments where an adhesive is applied to the nanofiber sheet(s) as an adhesive solution or dispersion, the adhesive solution or dispersion may include various components, including one or more polymers, crosslinking agents, solvents, and/or additives. Example crosslinking agents that may be used include but are not limited to epoxies, isocyanate, aziridine and/or metal chelates. Any type of suitable solvent may be used in the adhesive solution or dispersion, such as toluene, ethyl acetate, methyl-ethyl ketone, butyl acetate, methyl isobutyl ketone, hexane, and/or isopropyl alcohol, in some embodiments. In some embodiments, the adhesive solution or dispersion includes polymer to solvent in weight ratios between 10:1 and 1:10. In some particular embodiments, the weight ratio of polymer to solvent in the adhesive solution or dispersion is between 5:1 and 1:5 and in some embodiments is between 1:1 and 1:4. The adhesive solution or dispersion may also include crosslinking agent in a weight ratio between 0.1 and 10 percent and/or additive in a weight range between 0.1 and 50 percent. In some embodiments, more than one adhesive may be used in the adhesive solution. For example, in some embodiments, at least two different or at least three different adhesives may be included in the adhesive solution or dispersion. In some embodiments, the properties of the adhesive solution may be adjusted to provide increased affinity to either the nanofibers in the nanofiber sheet or the metal, if present. For example, in some embodiments the adhesive solution may be formulated to have increased or decreased hydrophilicity, thereby providing the solution with more or less affinity to the metal.

An adhesive solution or dispersion may be introduced to the nanofiber sheet(s) in at least two ways. In some embodiments, for example, the adhesive solution or dispersion may be applied to the substrate and the nanofiber sheet(s) may then be placed on the adhesive solution or dispersion. In other embodiments, the nanofiber sheet(s) may first be placed on a substrate and then an adhesive solution or dispersion may be applied to the nanofiber sheet(s) while positioned on the substrate. The adhesive solution or dispersion may be allowed to infiltrate the nanofiber sheets present as the sheets are at least slightly porous. The adhesive solution or dispersion can be applied to the nanofiber sheet in a batch process or a continuous process.

Method 200 continues with optionally removing 210 solvent from the adhesive solution, if an adhesive solution is used. The solvent may be removed from the adhesive solution by any technique. For example, the solvent may evaporate from the adhesive solution without additional treatment. In other embodiments, the composite may be heated or exposed to vacuum to remove the solvent. Solvent removal may, in some cases, densify the nanofiber sheet(s). For example, the total thickness of the nanofiber sheet(s) may be reduced by at least 10%, at least 20%, at least 30%, at least 40%, at least 50%, at least 60% at least 70% or at least 80% after the solvent is removed. In some embodiments, the level of densification may be proportional to the quantity of solvent removed from the adhesive solution. For example, a nanofiber sheet exposed to an adhesive solution with a weight ratio of 1:2 polymer to solvent may be more densified upon solvent removal than a nanofiber sheet exposed to an adhesive solution with a weight ratio of 1:1 polymer to solvent.

After formation, the adhesive nanofiber composite may be packaged in any desired fashion. For example, the adhesive nanofiber composite may be wound onto a roll or packaged while still on the substrate. Alternatively, the adhesive nanofiber composite may be removed from the substrate and packaged thereafter. For example, in some particular embodiments, the substrate may be removed from the adhesive nanofiber composite and the composite may be wound on itself to form a roll. In some embodiments, a release liner may be placed on an exposed surface of the adhesive nanofiber composite. For example, in some embodiments, a release liner may be placed on a surface of the adhesive nanofiber composite opposite the substrate. In these and other embodiments, the substrate may be removed from the adhesive nanofiber composite and may be replaced with a release liner. In some embodiments, the release liner has sufficient mechanical integrity to maintain its dimensions and shape during processing, thus minimizing the potential for damage to the nanofiber sheet. The release liner has sufficient adhesion with the nanofiber sheet so that the sheets are securely, but removably, bonded to the release liner. The adhesion between the release liner and the composite is not so strong that the sheets are unable to be detached from the release liner without damaging the composite. Example release liners include plastic films (including but not limited to polyesters such as silicone, polyethylene terephthalate (PET), polybutylene terephthalate, and polyethylene naphthalate (PEN), polyethylene films, polypropylene films, cellophanes, diacetyl cellulose films, triacetyl cellulose films, acetyl cellulose butyrate films, polyvinyl chloride films, polyvinylidene chloride films, polyvinyl alcohol films, ethylene-vinyl acetate copolymer films, polystyrene films, polycarbonate films, polymethylpentene films, polysulfone films, polyether ether ketone films, polyethersulfone films, polyetherimide films, polyimide films, fluorine resin films, polyamide films, acrylic resin films, norbornene resin films, and cycloolefin resin films), paper, silicone coated paper, metal foil, and/or a glass film. Numerous configurations will be apparent in light of this disclosure.

Example Methods

Numerous methods may be used to produce adhesive nanofiber composites in accordance with the subject disclosure. Some particular examples are described in detail herein.

In a first example process, a nanofiber sheet is drawn from a nanofiber forest and is optionally metallized. After drawing, the nanofiber sheet is then placed on a substrate and coated with an adhesive solution. In some embodiments, additional nanofiber sheets may be placed on the (first) nanofiber sheet to form a stack of nanofiber sheets. If present, additional nanofiber sheets are coated with an adhesive solution that may be the same or different from the adhesive solution coated on first nanofiber sheet. The adhesive solution then infiltrates the nanofiber sheets present. The solvent present in the adhesive solution is then evaporated, with or without additional processing, thereby densifying the nanofiber sheets.

In a second example process, a first nanofiber sheet is drawn from a nanofiber forest, is optionally metallized and placed on a substrate. One or more additional nanofiber sheets are then placed on the first nanofiber sheet, forming a stack of nanofiber sheets. An adhesive solution is applied to the stacked nanofiber sheets. After infiltrating the sheets, the solvent of the adhesive solution evaporates, resulting in densified nanofiber sheets.

In a third example process, either of example processes 1 or 2 may be performed and the substrate is stretched in one or more directions while the nanofiber sheets and adhesives solution are applied and the solvent is evaporated.

In a fourth example process, any of example processes 1-3 may be performed and the substrate may be planar, non-planar, curved, conical, cylindrical or spherical.

In a fifth example process, any of example processes 1-4 may be performed and one or more additives may be added to one or more of the nanofiber sheets. For example, in some embodiments, one or more of: metals, wires, nanoparticles, nanofibers, continuous thin sheets, metal oxides, polymers, ceramics, pigments, dyes, carbon materials, odor emitting compounds, and/or odor absorbing compounds may be added to the nanofiber sheet(s). In some particular embodiments, magnesium diboride, titanium dioxide, diamond, carbon nanotubes, fullerenes, graphene, carbon black, amorphous carbon, and/or lithium ion phosphate may be added to the nanofiber sheet(s).

In a sixth example process, any of example processes 1-5 may be performed and one or more additives are selectively patterned onto the nanofiber forest, nanofiber sheet and/or substrate such that some sections of the nanofiber forest, nanofiber sheet and/or substrate are free from additive(s) and other sections are coated or infiltrated with additive(s).

In a seventh example process, any of example processes 1-6 may be performed and one or more additives are applied to the nanofiber sheet before or after the nanofiber sheet is placed on the substrate.

In an eighth example process, any of example processes 1-7 may be performed and more than one type of adhesive may be added to the nanofiber sheet(s). For example, in some embodiments, a first type of adhesive solution may be applied to a first nanofiber sheet and a second type of adhesive solution may be applied to a second nanofiber sheet of the composite. In some particular embodiments, pressure sensitive adhesives, heat activated adhesives, resins, and/or UV-activated adhesives may be applied to the nanofiber sheet(s) of the adhesive nanofiber composite.

In a ninth example process, any of example processes 1-8 may be performed and the substrate may be formed of a polymer, plastic, thermoset, thermoplastic, heat-shrink, hot-melt, cured resin, uncured resin, natural rubber, synthetic rubber, silicon rubber, elastomer, textile, electrospun membrane, metal, composite, wood, and/or film. In some particular embodiments, the substrate is flexible and in other embodiments the substrate is inflexible.

In a tenth example process, any of example processes 1-9 may be performed and the stacked nanofiber sheets are oriented with parallel direction of nanofiber alignment. In other examples, the nanofibers in the stacked nanofiber sheet are not parallel to one another.

Experimental Examples

An example adhesive nanofiber composite was formed that included 20 nanofiber sheets, a polyacrylate-based adhesive and a silver metal layer having a thickness of approximately 150 nm. This example adhesive nanofiber composite had a measured electrical resistance of 0.7 Ω/square.

The foregoing description of the embodiments of the disclosure has been presented for the purpose of illustration; it is not intended to be exhaustive or to limit the claims to the precise forms disclosed. Persons skilled in the relevant art can appreciate that many modifications and variations are possible in light of the above disclosure.

The language used in the specification has been principally selected for readability and instructional purposes, and it may not have been selected to delineate or circumscribe the inventive subject matter. It is therefore intended that the scope of the disclosure be limited not by this detailed description, but rather by any claims that issue on an application based hereon. Accordingly, the disclosure of the embodiments is intended to be illustrative, but not limiting, of the scope of the invention, which is set forth in the following claims.

What is claimed is:

1. An adhesive nanofiber composite comprising:
   a plurality of nanofiber sheets arranged in a stack direction, wherein at least one nanofiber sheet among the plurality of nanofiber sheets comprises a plurality of carbon nanotubes aligned substantially end to end on a plane and in a direction parallel to a drawing direction of the at least one nanofiber sheet, the at least one nanofiber sheet having a first surface and a second surface opposite of the first surface, wherein an outer nanofiber sheet among the plurality of nanofiber sheets is disposed on top of the plurality of nanofiber sheets and has a first surface exposed and a second surface, the second surface being in contact with a first surface of at least one underlying nanofiber sheet among the plurality of nanofiber sheets;
   a metal layer conformally deposited on the outer nanofiber sheet, wherein the metal layer penetrates through the outer nanofiber sheet and at least partially coats the at least one underlying nanofiber sheet and
   an adhesive layer:
   a) in contact with a second surface of the at least one underlying nanofiber sheet;
   b) coating the at least one underlying nanofiber sheet for filling voids between the plurality of carbon nanotubes;
   c) penetrating the at least one underlying nanofiber sheet and
   d) in contact with the second surface of the outer nanofiber sheet while the first surface of the outer nanofiber sheet remains free of adhesive,
   wherein the adhesive layer, the metal layers, and the plurality of nanofiber sheets form an adhesive nanofiber composite with an electrical resistance of less than 10 Ω/cm.

2. The adhesive nanofiber composite of claim 1, wherein the adhesive layer includes a pressure sensitive adhesive.

3. The adhesive nanofiber composite of claim 1, wherein the adhesive layer includes adhesive that is selected from the group consisting of acrylics, polyurethanes, latexes, butyl rubbers, natural rubbers, styrene block copolymer, polyester, silicone, polyvinyl ester and combinations thereof.

4. The adhesive nanofiber composite of claim 1, wherein the adhesive layer has an adhesive strength of between 2-30 N/25 mm on a stainless steel substrate.

5. The adhesive nanofiber composite of claim 1, wherein at least two nanofiber sheets are included in the adhesive nanofiber composite.

6. The adhesive nanofiber composite of claim 1, further comprising a removable substrate attached to the adhesive layer opposite of the at least one nanofiber sheet.

7. The adhesive nanofiber composite of claim 6, wherein the removable substrate is deformable.

8. The adhesive nanofiber composite of claim 1, wherein the buffer layer comprises a carbide-forming metal.

9. The adhesive nanofiber composite of claim 8, wherein the carbide-forming metal is titanium.

10. The adhesive nanofiber composite of claim 1, wherein the buffer layer has a coating thickness of less than 30 nm.

11. The adhesive nanofiber composite of claim 1, wherein the adhesive nanofiber composite is stretchable.

12. The adhesive nanofiber composite of claim 1, wherein the adhesive nanofiber composite has a total thickness of less than 5 microns.

13. The adhesive nanofiber composite of claim 1, wherein the at least one nanofiber sheet has a thickness of less than 10 nm.

14. The adhesive nanofiber composite of claim 1, wherein the adhesive nanofiber composite has a structure such that allows it to stretch at least 50% further than its length when a force is applied.

15. The adhesive nanofiber composite of claim 1 further comprising a buffer layer between the carbon nanotubes and the metal layer.

16. The adhesive nanofiber composite of claim 15, wherein a metal of the metal layer comprises at least one of gold, silver, copper, and aluminum.

17. A metalized adhesive nanofiber composite comprising:
a plurality of nanofiber sheets arranged in a stack direction, wherein at least one nanofiber sheet among the plurality of nanofiber sheets comprises a plurality of carbon nanotubes aligned substantially end to end on a plane and in a direction parallel to a drawing direction of the at least one nanofiber sheet, the at least one nanofiber sheet having a first surface and a second surface opposite of the first surface, wherein an outer nanofiber sheet among the plurality of nanofiber sheets is disposed on top of the plurality of nanofiber sheets and has a first surface exposed and a second surface, the second surface being in contact with a first surface of at least one underlying nanofiber sheet among the plurality of nanofiber sheets;
a metal layer conformally deposited on the outer nanofiber sheet, wherein the metal layer penetrates through the outer nanofiber sheet and at least partially coats the at least one underlying nanofiber sheet and
an adhesive layer:
a) in contact with a second surface of the at least one underlying nanofiber sheet;
b) coating the at least one underlying nanofiber sheet for filling voids between the plurality of carbon nanotubes;
c) penetrating the at least one underlying nanofiber sheet and
d) in contact with the second surface of the outer nanofiber sheet while the first surface of the outer nanofiber sheet remains free of adhesive.

18. The metalized adhesive nanofiber composite of claim 17, wherein the adhesive layer includes adhesive that is selected from the group consisting of acrylics, polyurethanes, butyl rubbers, natural rubbers, styrene block copolymer, polyester, silicone, polyvinyl ester and combinations thereof.

19. The metalized adhesive nanofiber composite of claim 17, wherein a metal of the metal layer comprises at least one of gold, silver, copper, platinum, nickel, tin, zinc, lithium, tungsten, aluminum, and palladium.

20. The metalized adhesive nanofiber composite of claim 17, wherein the buffer layer comprises titanium.

* * * * *